United States Patent
Cooper et al.

(10) Patent No.: US 8,188,846 B2
(45) Date of Patent: May 29, 2012

(54) SYSTEM AND METHOD FOR DISPLAYING INFORMATION TO VEHICLE OPERATOR

(75) Inventors: Jared K. Cooper, Melbourne, FL (US); Todd Goodermuth, Melbourne, FL (US); Omer Zaki, San Diego, CA (US)

(73) Assignee: General Electric Company, Schenectady, NY (US)

( * ) Notice: Subject to any disclaimer, the term of this patent is extended or adjusted under 35 U.S.C. 154(b) by 533 days.

(21) Appl. No.: 12/486,170

(22) Filed: Jun. 17, 2009

(65) Prior Publication Data

US 2010/0321170 A1 Dec. 23, 2010

(51) Int. Cl.
- B60Q 1/00 (2006.01)
- G09F 9/00 (2006.01)
- G09G 5/00 (2006.01)

(52) U.S. Cl. ...... 340/425.5; 340/461; 340/980; 340/525; 340/815.4; 340/691.6; 345/7; 345/8

(58) Field of Classification Search ........ 340/425.5, 340/461; 345/7
See application file for complete search history.

(56) References Cited

U.S. PATENT DOCUMENTS

| | | | |
|---|---|---|---|
| 3,945,716 A | 3/1976 | Kinder | |
| 4,790,613 A * | 12/1988 | Moss | 340/461 |
| 4,937,665 A * | 6/1990 | Schiffman | 348/115 |
| 4,998,784 A | 3/1991 | Freeman | |
| 5,005,009 A | 4/1991 | Roberts | |
| 5,051,735 A | 9/1991 | Furukawa | |
| 5,061,996 A | 10/1991 | Schiffman | |
| 5,381,267 A | 1/1995 | Woody | |
| 5,566,025 A | 10/1996 | Knoll | |
| 5,751,576 A | 5/1998 | Monson | |
| 5,867,133 A | 2/1999 | Toffolo | |
| 6,240,347 B1 | 5/2001 | Everhart | |
| 6,456,260 B1 * | 9/2002 | Koenig et al. | 345/7 |
| 6,631,322 B1 | 10/2003 | Arthur | |
| 6,639,569 B2 * | 10/2003 | Kearns et al. | 345/7 |
| 6,768,944 B2 | 7/2004 | Breed | |
| 7,015,876 B1 | 3/2006 | Miller | |
| 7,126,583 B1 | 10/2006 | Breed | |
| 7,135,961 B1 | 11/2006 | Operowsky | |
| 7,382,284 B1 | 6/2008 | Armstrong | |
| 7,433,782 B2 | 10/2008 | Operowsky | |
| 2005/0259033 A1 | 11/2005 | Levine | |
| 2006/0139234 A1 * | 6/2006 | Tanaka | 345/9 |
| 2007/0057781 A1 | 3/2007 | Breed | |
| 2007/0194902 A1 | 8/2007 | Blanco et al. | |
| 2008/0048930 A1 | 2/2008 | Breed | |
| 2008/0051946 A1 | 2/2008 | Breed | |
| 2008/0158096 A1 | 7/2008 | Breed | |
| 2008/0297488 A1 | 12/2008 | Operowsky et al. | |

\* cited by examiner

Primary Examiner — Donnie Crosland

(74) Attorney, Agent, or Firm — GE Global Patent Operation; John A. Kramer

(57) ABSTRACT

A display system for displaying information to a vehicle operator comprises one or more projectors positioned in an operator cab of a vehicle. The projector is configured to project a heads up display of a plurality of data sets on a windscreen of the vehicle. Projected data sets are positioned in the heads up display and/or moved within the heads up display based on assessed relative priority levels of the data sets. Thus, for example, a data set with a higher assessed relative priority level may be positioned in a location of greater operator viewing prominence. If the priority level drops, the data set may be moved to a position of lower operator prominence. Respective heads up displays may be projected on more than two separate windscreens of the vehicle, either simultaneously or at alternate times, and possibly depending on an operational mode of the vehicle.

34 Claims, 20 Drawing Sheets

SYSTEM AND METHOD FOR DISPLAYING INFORMATION TO VEHICLE OPERATOR

FIELD OF THE INVENTION

Embodiments of the invention relate to electronic display systems. Other embodiments relate to systems for displaying information to operators of a vehicle.

BACKGROUND OF THE INVENTION

In locomotives, off-highway vehicles (e.g., mine trucks), and other large commercial vehicles, the trend has been to at least partially computerize (electronically control) the vehicle to improve vehicle performance. As part of this process, it is typically the case that various data items are displayed to an operator of the vehicle, to convey information about how the vehicle is being electronically controlled, or to otherwise provide information about vehicle operations.

In certain vehicles, to the extent vehicle operations information is electronically displayed at all, it is through small, dedicated-purpose LCD or LED units, such as 7-segment LED modules or strip-type monochrome LCD units. For example, a current speed of a vehicle may be displayed on an LCD unit instead of using an analog speedometer. In other, more advanced vehicles, information is displayed on one or more general-purpose display screens, e.g., LCD screens (such as those used as computer monitors or GPS units) or small CRT units. The display screen is typically built into a vehicle dashboard, to avoid interfering with the operator's line of sight through the front windscreen of the vehicle.

General-purpose LCD screens are easy to adapt for displaying vehicle operations data. However, especially for situations where complex data is displayed, or where many data items are displayed at the same time, it is difficult for the vehicle operator to simultaneously read and comprehend the displayed information, control the vehicle, and pay attention to what is happening external to the vehicle. In most cases, the operator momentarily abandons his oversight of external conditions in favor of reading the display screen. This may be dangerous, and even then it may be difficult for the operator to identify and comprehend the data items that are most of interest to the operator. These instances impair the driver's situational awareness. Additionally, if the driver has to navigate the vehicle while looking through a windscreen not near the display screen, e.g., a rear window, it may be impossible for the operator to view the information on the display screen at all.

BRIEF DESCRIPTION OF THE INVENTION

An embodiment of the present invention relates to a display system for displaying information to a vehicle operator. The display system comprises a projector positioned in an operator cab of a vehicle. ("Operator cab" refers to any at least partially enclosed space where a human operator resides for controlling a vehicle.) The projector is configured to project a heads up display of a plurality of data sets on a windscreen of the vehicle. "Data set" refers to one or more items of data, and "heads up display" means an at least partially transparent display that presents data sets without requiring the operator to look away from his or her usual viewpoint for operation of the vehicle. (For example, the area around each data item and/or the area between data sets may be translucent or transparent, for minimizing the extent to which the operator's view through the windscreen is obscured, and avoiding or at least reducing situations where an area around a data item is opaque but does not contain any information.) The display system additionally comprises a display control unit connected to the projector and to a control system of the vehicle. The display control unit is configured to control the projector for moving one of the data sets in the display (a "first" data set) from a first area of the windscreen to a second area of the windscreen, based on an assessed priority level of the first data set. An operator prominence level of the first data set, when displayed at the second area, is greater than when the first data set is displayed at the first area. That is, when operating the vehicle, the operator looks through the second area of the windscreen more than the first area, for viewing conditions external to the vehicle. Thus, at times when the data set is deemed to be of lower relative priority, it is displayed at the first area, accessible for viewing but away from the operator's main focus of attention. At times when the data set is deemed to be of higher relative priority, it is displayed at the second area, within (or at least closer to) the operator's main focus of attention.

Another embodiment relates to a method for displaying information to a vehicle operator. The method comprises generating a heads up display of a first data set on a first area of a first windscreen of a vehicle. The method further comprises assessing a priority level of the first data set relative to operation of the vehicle. This may be an active assessment, meaning the data set is periodically compared to one or more criteria that are updated or revised on an ongoing basis, or an implied or predetermined assessment, meaning that the data set falls within a predetermined designated range, with one end of the range having a higher priority level and the other end of the range having a lower priority level. Based on the assessed priority level of the first data set, the display of the first data set is moved from the first area of the windscreen to a second area of the windscreen. Again, an operator prominence level of the display of the first data set is greater at the second area of the windscreen than at the first area.

Another embodiment relates to a display system for displaying information to an operator of a rail vehicle. The display system comprises a projector positioned in an operator cab of the rail vehicle. For example, the rail vehicle may be a locomotive. The projector is configured to project a heads up display on a windscreen of the rail vehicle. The display system additionally comprises a display control unit connected to the projector and to a control system of the rail vehicle. The display control unit is configured to control the projector for displaying, as part of the heads up display, a plurality of data sets relating to operations of the rail vehicle. The displayed data sets are periodically updated based on information received from the control system of the vehicle. The data sets comprise a first data set relating to a speed of the rail vehicle and a second data set relating to a trip plan of the rail vehicle. ("Trip plan" refers to a predetermined schedule for controlling the rail vehicle, comprising for example throttle and braking commands, which is at least partially electronically determined, and which is either carried out automatically by the control system of the rail vehicle, carried out partially by the operator and partially by the control system, or that is carried out by the operator based on control suggestions communicated to the operator.)

Another embodiment relates to a display system for displaying information to a vehicle operator. The display system comprises a projector system positioned in an operator cab of a vehicle. The display system additionally comprises a display control unit connected to the projector system and to a control system of the vehicle. The display control unit is configured to control the projector system for projecting a first heads up display on a first windscreen of the vehicle when the vehicle is traveling at a first orientation of the vehicle. The display control unit is further configured to control the projector system for projecting a second heads up display on a second windscreen of the vehicle when the vehicle is traveling at a second orientation of the vehicle. The first and second heads up displays each include respective information relating to operations of the vehicle. "Vehicle orientation" refers to a geometrical arrangement of the vehicle with respect to a direction of travel of the vehicle. For example, for a mining truck traveling in a direction "A," the mining truck would be at a first vehicle orientation if traveling in a "drive" gear with the front of the truck leading, and would be at a second, different vehicle orientation if traveling in a "reverse" gear with the back of the truck leading in direction "A."

Another embodiment relates to a method for displaying information to a vehicle operator. The method comprises generating a first heads up display on a first windscreen of a vehicle, when the vehicle is traveling at a first orientation of the vehicle. The method further comprises generating a second heads up display on a second windscreen of the vehicle, when the vehicle is traveling at a second orientation of the vehicle.

In another embodiment, the heads up display on the first windscreen is deactivated when the vehicle is traveling at the second orientation of the vehicle. Additionally, the heads up display on the second windscreen is deactivated when the vehicle is traveling at the first orientation of the vehicle.

In another embodiment, the projector system comprises a projector. The display system further comprises a projector mount system connected to a surface of the operator cab. The projector is attached to and supported by the projector mount system. The projector mount system is electrically controllably for non-manual movement of the projector to a plurality of different projector orientations. (The projector mount system may also be configured to allow an operator to manually move the projector.) The display control unit is configured to control the projector mount system to orient the projector for projection of the first heads up display on the first windscreen when the vehicle is traveling at the first orientation of the vehicle, and to control the projector mount system to re-orient the projector for projection of the second heads up display on the second windscreen when the vehicle is traveling at the second orientation of the vehicle.

In another embodiment, the projector system comprises two projectors. A first of the two projectors is configured (e.g., positioned) for projection of the first heads up display on the first windscreen. The second of the two projectors is configured (e.g., positioned) for projection of the second heads up display on the second windscreen.

Another embodiment relates to a display system for displaying information to an operator of a rail vehicle. The display system comprises a projector system positioned in an operator cab of a rail vehicle. The display system further comprises a display control unit connected to the projector system and to a control system of the rail vehicle. The display control unit is configured to control the projector system for projecting a first heads up display on a front windscreen of the rail vehicle when the rail vehicle is traveling in a short-hood forward orientation. The display unit is further configured to control the projector system for projecting a second heads up display on a rear door window of the rail vehicle when the rail vehicle is traveling at a long-hood forward orientation of the rail vehicle.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Still further, the foregoing brief description, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, any computer/controller instructions (e.g., software programs) described herein may be stand-alone programs, may be incorporated as subroutines in an operating system, may be functions in an installed software or hardware package, and the like. The various embodiments are not limited to the arrangements and instrumentality shown in the drawings.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
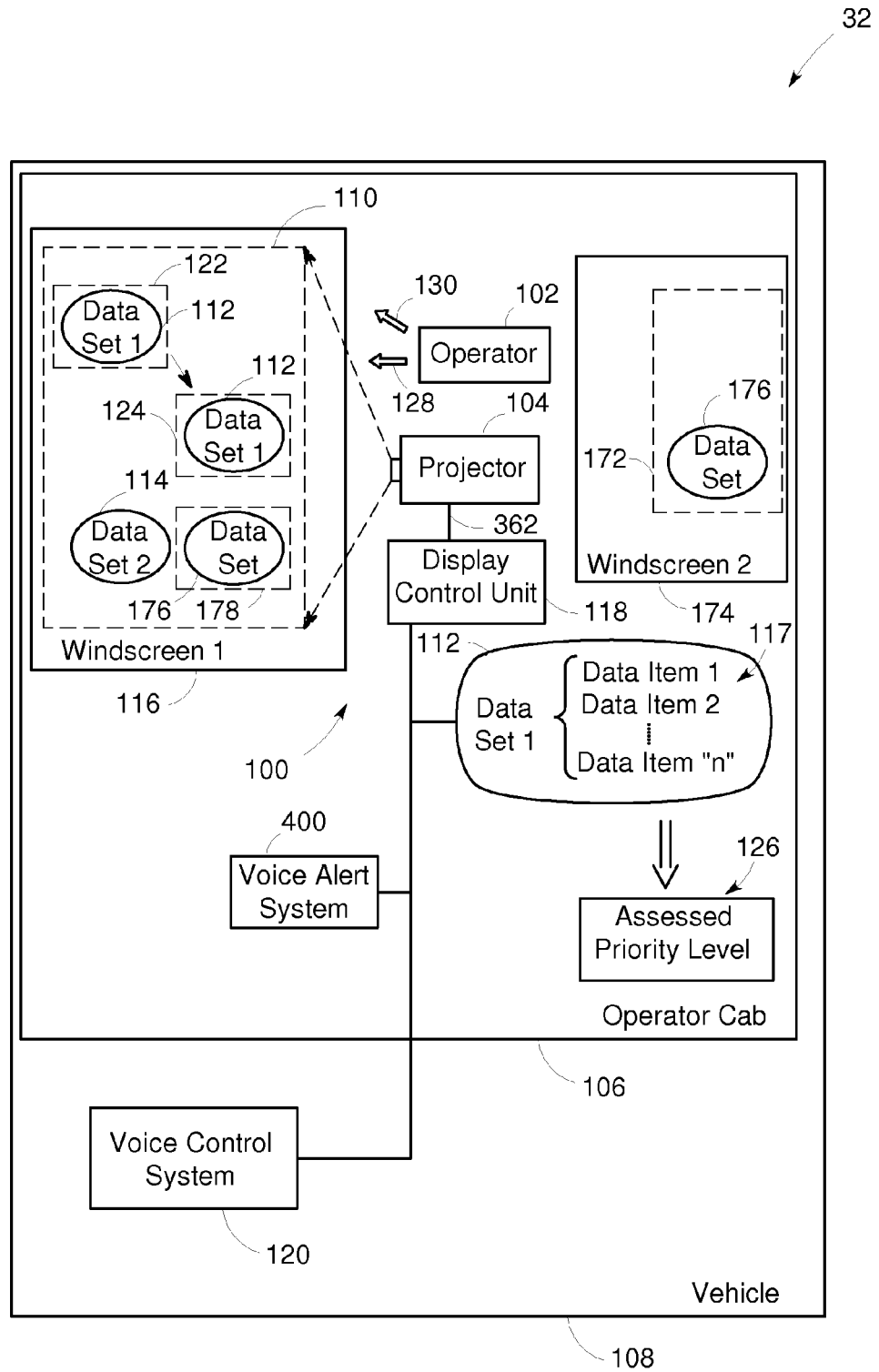
FIG. 1 is a schematic diagram of a display system for displaying information to a vehicle operator, according to one embodiment of the present invention.

With reference to FIG. 1, an embodiment of the present invention relates to a display system 100 for displaying information to a vehicle operator 102. The display system 100 comprises a projector 104 positioned in an operator cab 106 of a vehicle 108. ("Operator cab" refers to any at least partially enclosed space where a human operator resides for controlling a vehicle.) The projector 104 is configured to project a heads up display 110 of a plurality of data sets 112, 114 on a windscreen 116 of the vehicle 108. "Data set" refers to one or more items of data 117, and "heads up display" means an at least partially transparent display that presents data sets without requiring the operator to look away from his or her usual viewpoint for operation of the vehicle. (For example, the area around each data item and/or the area between data sets may be translucent or transparent, for minimizing the extent to which the operator's view through the windscreen is obscured, and avoiding or at least reducing situations where an area around a data item is opaque but does not contain any information.) The display system 100 additionally comprises a display control unit 118 connected to the projector 104 and to a control system 120 of the vehicle 108. The display control unit 118 is configured to control the projector 104 for moving one of the data sets 112 in the display 110 (a "first" data set 112) from a first area 122 of the windscreen 116 to a second area 124 of the windscreen 116, based on an assessed priority level 126 of the first data set 112. In one embodiment, an operator prominence level 128 of the first data set 112, when displayed at the second area 124, is greater than an operator prominence level 130 when the first data set is displayed at the first area 122. That is, when operating the vehicle 108, the operator 102 looks through the second area 124 of the windscreen 116 more than the first area 122, for viewing conditions 132 external to the vehicle 108. Thus, at times when the data set 112 is deemed to be of lower relative priority, it is displayed at the first area 122, accessible for viewing 130 but away from the operator's main focus of attention 128. At times when the data set 112 is deemed to be of higher relative priority, it is displayed at the second area 124, within (or at least closer to) the operator's main focus of attention.

Figure 2:
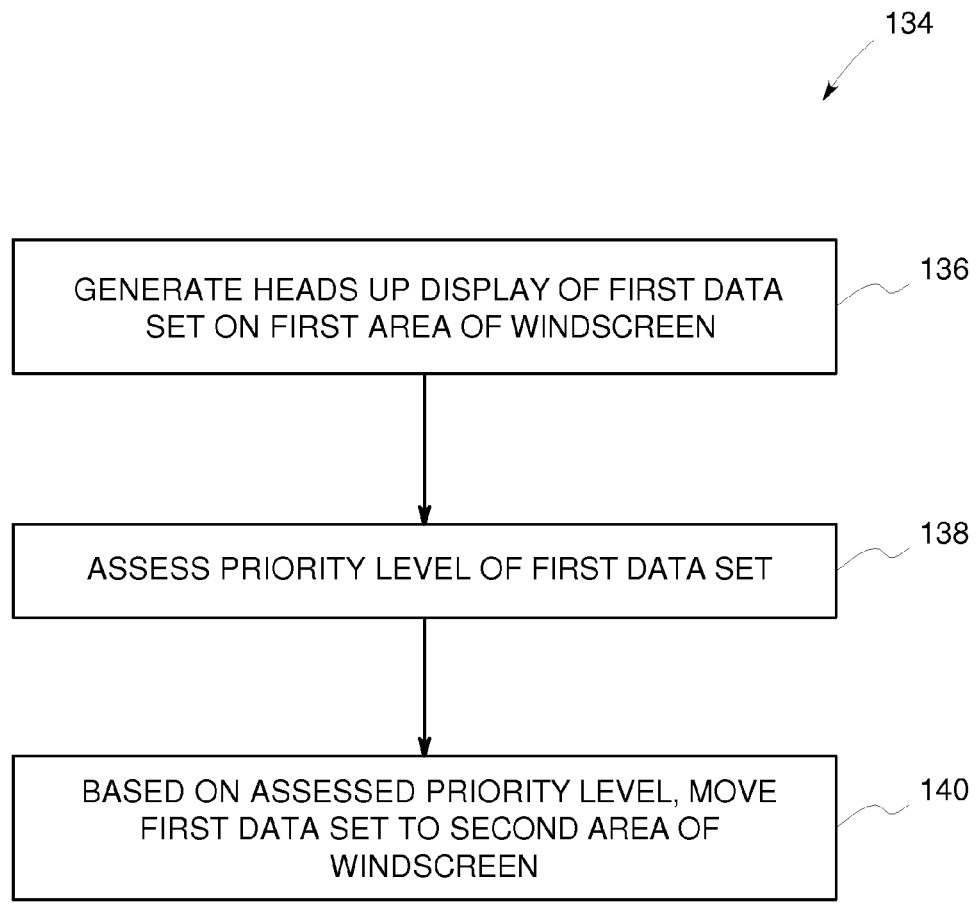
FIG. 2 is a flowchart showing a method for displaying information to a vehicle operator, according to another embodiment of the invention.

Another embodiment, therefore, with reference to FIG. 2, relates to a method 134 for displaying information to a vehicle operator 102. The method comprises generating a heads up display 110 of a first data set 112 on a first area 122 of a windscreen 116 of a vehicle 108, at Step 136. The method further comprises assessing a priority level 126 of the first data set 112 relative to operation of the vehicle 108, as Step 138. Based on the assessed priority level of the first data set, the display of the first data set is moved from the first area 122 of the windscreen 116 to a second area 124 of the windscreen 116, at Step 140. In one embodiment, an operator prominence level of the display of the first data set is greater at the second area of the windscreen than at the first area.

Figure 3:
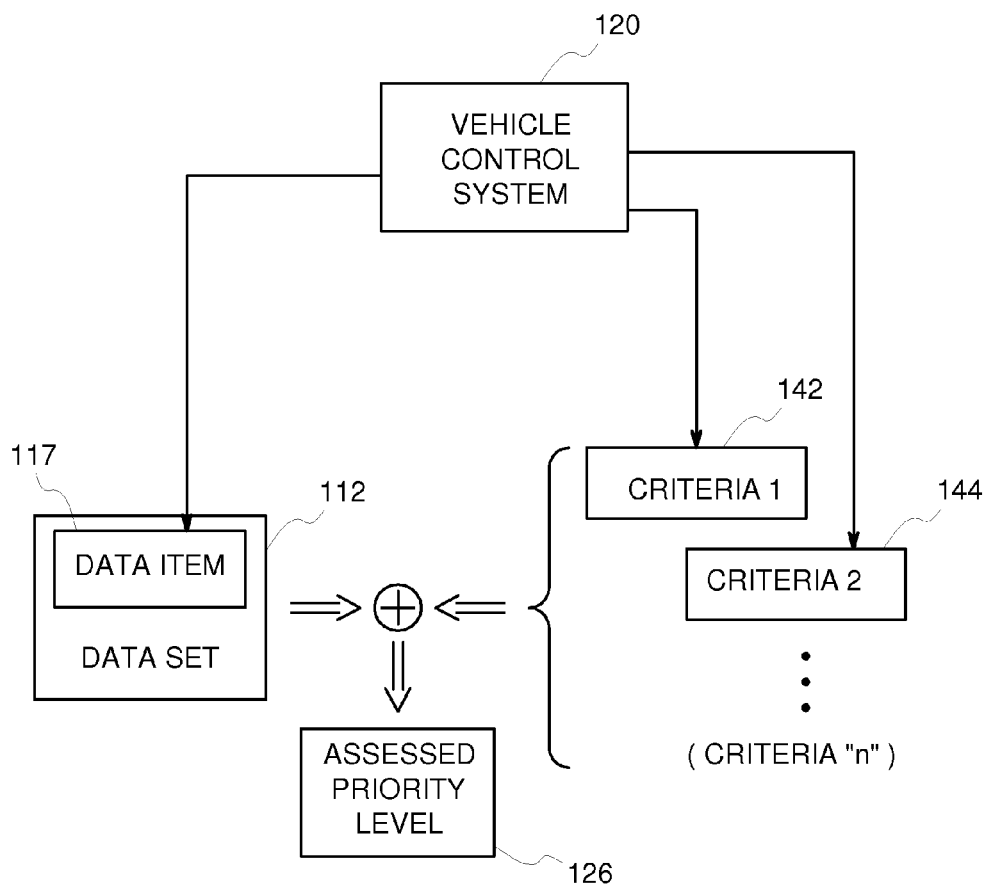
FIGS. 3-5 are schematic diagrams illustrating the assessment of a priority level for a displayed data set, according to various embodiments of the invention.

The priority level of the data set 112 may be assessed in different manners, depending on the data contained in the data set. In one embodiment, with reference to FIG. 3, the data set 112 is actively assessed, meaning that the data set 112 is periodically compared to one or more criteria 142, 144 that may change, e.g., the criteria are updated or revised on an ongoing basis. Thus, periodically, depending on the nature or type of data and criteria involved, the data set 112 is updated based on information received from the vehicle control system 120. For example, if the data set 112 contains a single data item 117 relating to a speed of the vehicle 108, the data item 117 (and therefore data set 112) may be updated/refreshed every 1 second or thereabouts based on vehicle speed data received from the vehicle control system 120. Similarly, the criteria 142, 144 are updated based on information received from the vehicle control system or otherwise. For example, if the data set 112 relates to vehicle speed, then a first criterion 142 might be vehicle position and a second criterion 144 might be a signal status or aspect in a region in which the vehicle 108 is traveling (signal status/aspect referring to a traffic/vehicle control signal communicated by a wayside device, traffic signal, etc.) Such criteria might be updated on a regular basis (for example, vehicle position might be updated once every minute), or when needed based on received data (for example, signal status might be updated when information is received of a signal change). Based on these criteria 142, 144 in this example, a speed limit is determined as a function of location and signal status (and possibly other factors). The current vehicle speed, as reflected in the data set 112, is compared to the speed limit, and based on this comparison is assigned a priority level according to a predetermined scale or other relationship. As one possible example, for a current speed "V" and a determined speed limit "S":

If V>S, then priority level of data set 112=highest
If (S−2 mph)≦V≦S, then priority level=intermediate
If V<(S−2 mph), then priority level=lowest Here, a relative priority level of the data set 112 is assessed based on how close the current vehicle speed is to a speed limit, with the data set 112 having a highest relative priority if the speed exceeds the speed limit, an intermediate priority if within 2 mph (3.22 kph) of the speed limit, and a lowest priority level if lower than within 2 mph of the speed limit.

Figure 4:
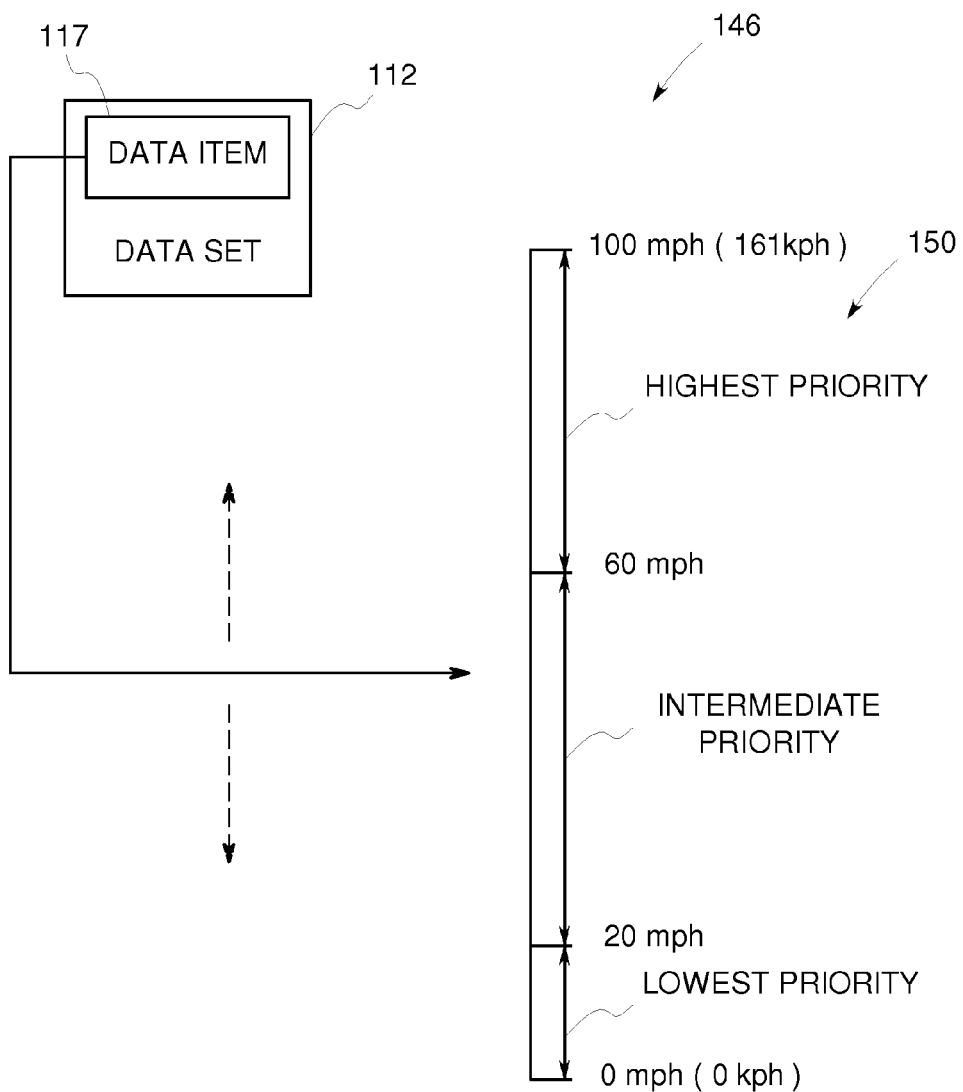
Figure 5:
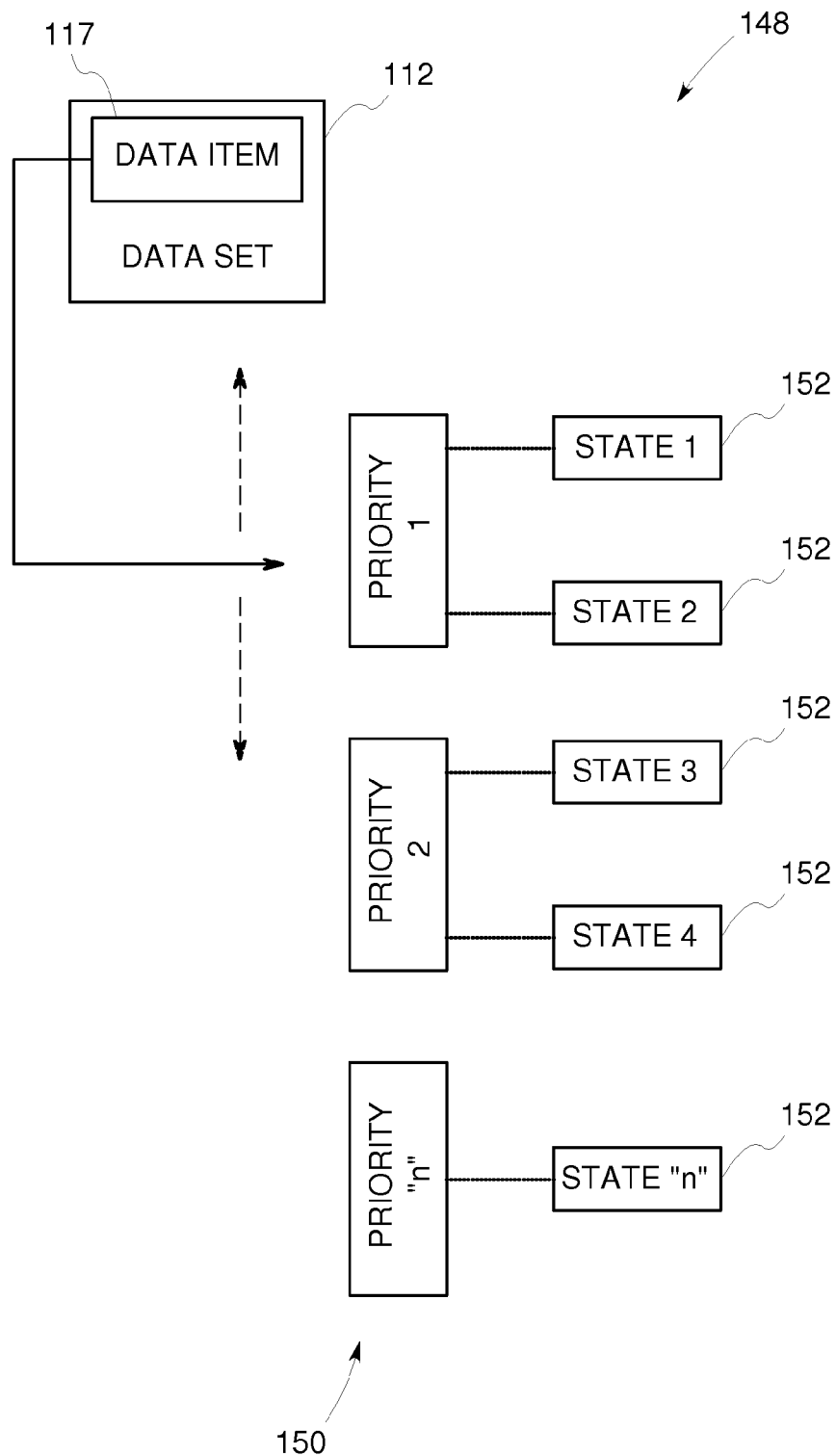

With reference to FIGS. 4 and 5, data sets 112 may instead be subjected to an implied or predetermined assessment. In such a case, a data item 117 within a data set 112 is known to fall within a predetermined range 146, 148 of possible values for that type of data set. For example, a speed-related data item might fall within a range 146 of 0 mph (0 kph) to 100 mph (161 kph), with the later representing a maximum speed of a vehicle before activation of speed governors that automatically brake the vehicle. The range of possible values 146 is subdivided (or otherwise organized) into a plurality of priority levels 150. For the assessment, the data item 117 is compared to the range. The data item is assessed as having the priority level that corresponds to where the data item falls within the range. As shown in FIG. 5, instead of a range of numerical values, for certain types of data, the predetermined range 148 might be a set of data states 152. For example, if a data item relates to a signal status, then the states 152 might include "red (stop)," "yellow (caution/slow)," "green (unrestricted)," "red blinking (stop/special)," each having a corresponding priority level 150.

Figure 6:
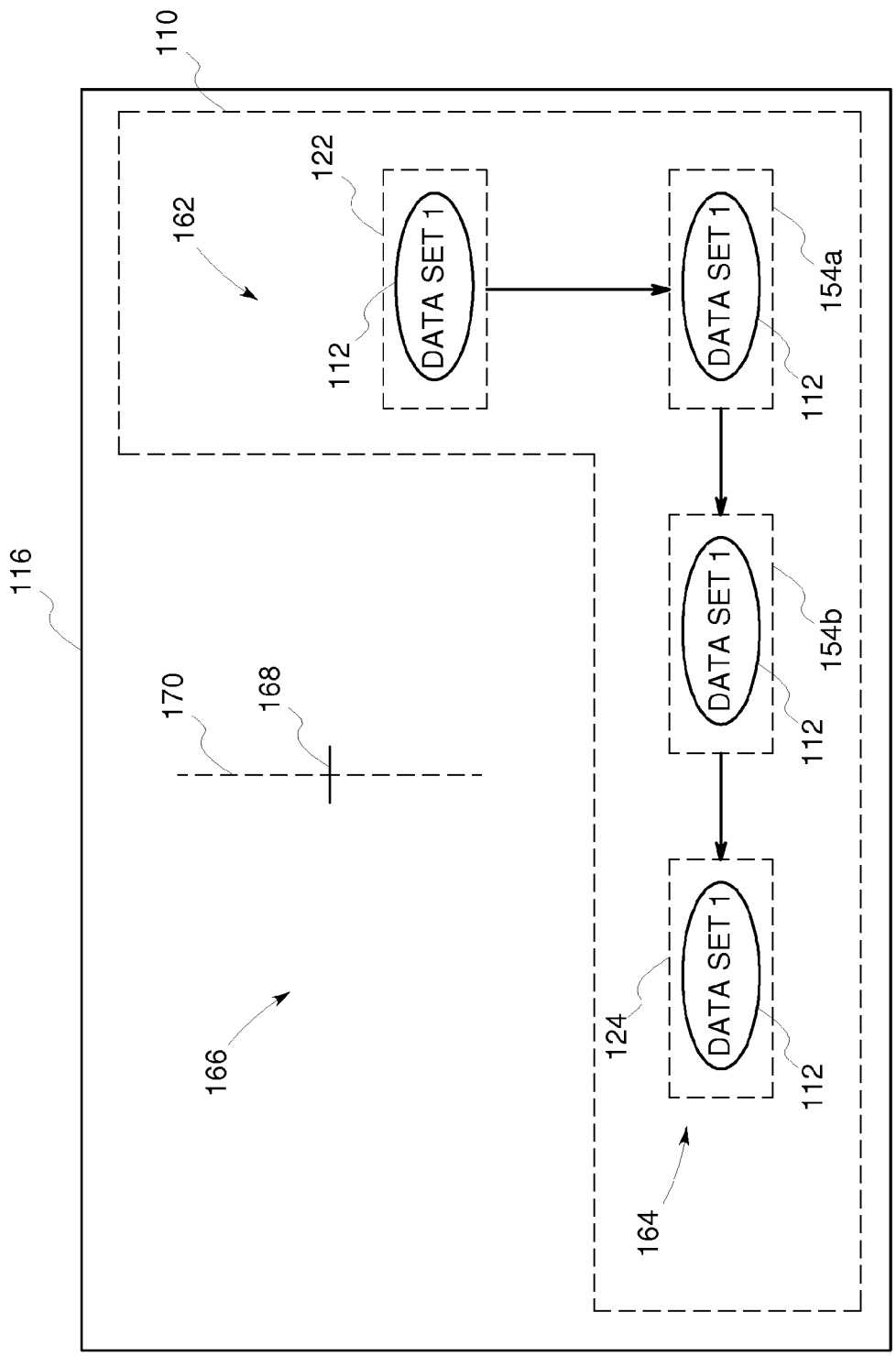
FIG. 6 is a schematic diagram of a windscreen and heads up display, according to an embodiment of the invention.

FIG. 1 shows the first data set 112 being moved from a first area 122 of the windscreen to a second area 124 of the windscreen. In one embodiment, for movement from the first area to the second area, display of the data set 112 is discontinued at the first area 122 and re-initiated at the second area 124. Such an operation would typically be done if the data set 112 were assessable at one of two possible priority levels, namely, a first priority level and a second priority level, where the second priority level is higher than the first priority level. In other words, if the data set were assessed at the first, lower priority level, it would be displayed at the first area, and if the data set were assessed at the second, higher priority level, it would be displayed at the second area. Depending on the data items in a particular data set, however, the display control unit 118 may control the projector 104 to progressively move the first data set 112 from the first area 122 to a plurality of intermediate areas 154a, 154b of the windscreen 116 between the first area and the second area, based on changes in the assessed priority level of the first data set 112. Thus, as shown in FIG. 6, if the data set 112 is assessed as having a first priority level, it is displayed at area 122, if the data set 112 is assessed as having a second priority level it is displayed at area 154a, if the data set is assessed as having a third priority level it is displayed at area 154b, and so on. It will typically be the case that the displayed data set 112 is moved from an area with a lower operator prominence level to an area with a higher operator prominence level as the assessed priority level of the data set increases, and that the data set is moved from one area to the next area in sequence (e.g., first from area 122 in FIG. 6 to area 154a, and then to area 154b, and then to area 124), but this is not always the case.

FIG. 6 illustrates the data set 112 being moved between four areas 122, 154a, 154b, 124 of the windscreen 116, with each area being spaced apart from its neighbors. As noted above, in this particular example, this suggests four possible priority levels for the data set 112. The data set 112 may be moved to each of these areas by discontinuing display at the current area of the data set and re-initiating display of the data set at the new area. However, in some cases the operator may not notice that the data set was moved in this manner, e.g., if the operator blinks or is momentarily looking away. Therefore, the data set may be moved between display areas in a progressive manner where it appears to the operator that the data set is actually moving across the display 110, using standard video/computer display processing and animation methods.

Figures 7, 8:
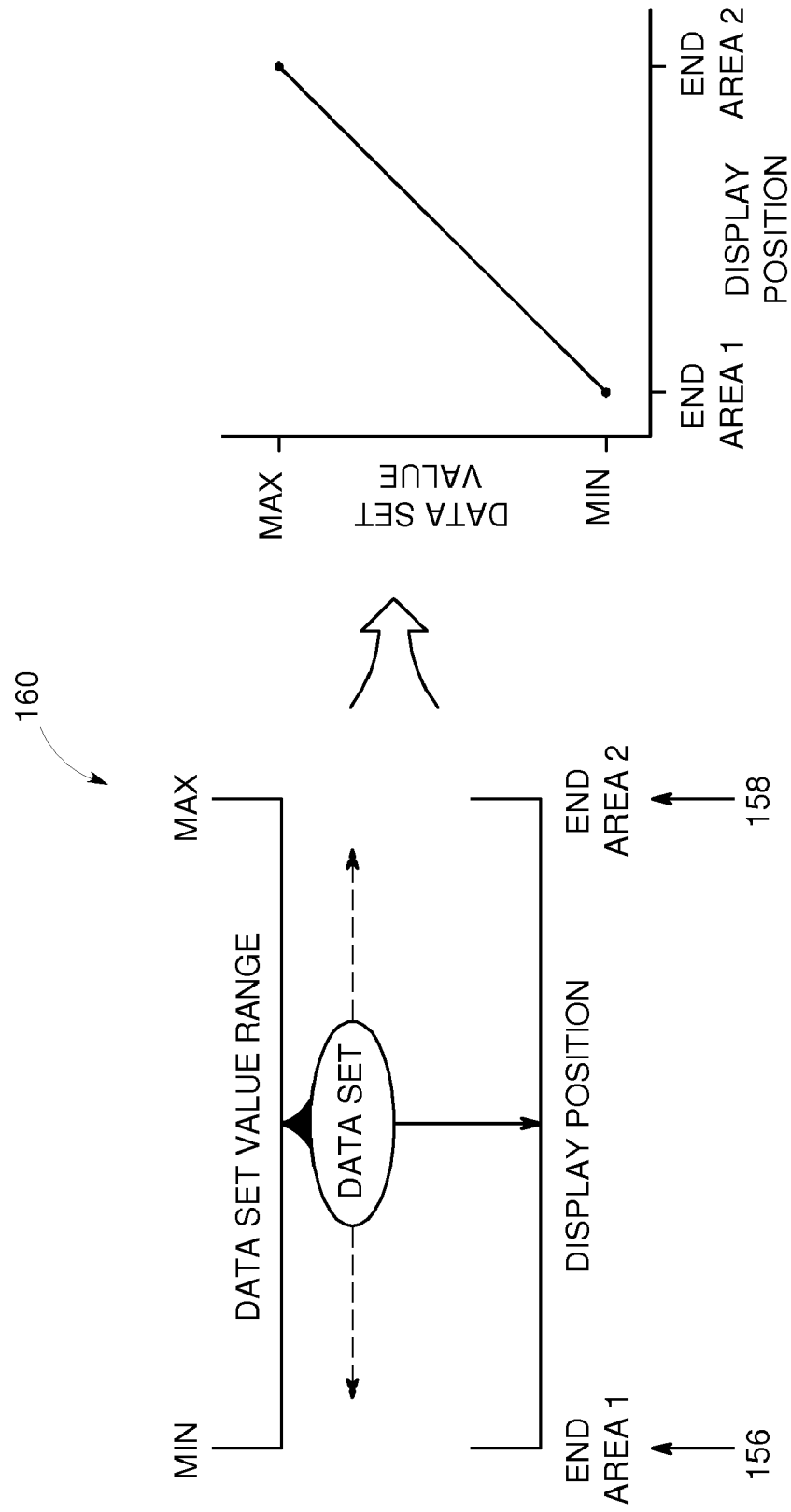
FIGS. 7-9 illustrate the correlation of display position to data set assessed priority level, according to various embodiments of the invention.

With reference to FIG. 7, instead of several predefined, static display areas and corresponding priority levels, a data set 112 may be moved in a progressive manner, between two end display areas 156, 158 of the windscreen 116 (the end display areas in effect correspond to the two areas 122, 124 in FIG. 1), proportional to where the data set 112 falls within a range 160 of the possible values for the data set. In such an embodiment, the display control unit 118 would be configured to control the projector 104 to position the data set 112 at or between a first area 156 and a second area 158 proportional to the assessed priority level of the data set 112. In particular, the data set 112 would be positioned at the first area 156 when the assessed priority level of the data set was at a lowest value ("min") in a designated priority range 160 of the data set, and the data set would be positioned at the second area 158 when the assessed priority level of the data set was at a highest value ("max") in the designated priority range 160 of the data set. In between the "min" and "max" values, the data set 112 would be proportionally positioned between the two end areas 156, 158. This includes the possibility of making it appear to the operator that the data set is moving across the screen, using standard video/computer display processing and animation methods.

As should be appreciated, the data set assessment in FIG. 7 is an implied assessment, similar to FIGS. 4 and 5 above. This means that in the range 160 of possible values for the data set 112, values towards one end of the range are understood to be indicative of (correspond to) a lower priority level, and values towards the other end of the range are understood to be indicative of (correspond to) a higher priority level. In other words, one end of the range corresponds to a first, lowest priority level, and the other end of the range corresponds to a second, highest priority level. In one embodiment, as a data set 112 moves in value from an implied lower priority to an implied higher priority value, the display of the data set is moved from an area with a lower operator prominence level to an area with a higher operator prominence level. As one example, in the case of vehicle speed data, the minimum value in the range 160 might be 0 mph (0 kph), and the maximum value in the range 160 might be 100 mph (161 kph), with the 0 mph (0 kph) value impliedly corresponding to a lowest priority level and the 100 mph (161 kph) value impliedly corresponding to a highest priority level. If the data set 112 indicates a 0 mph (0 kph) value, the data set 112 is displayed at a first end area 156 (for example, the end area might correspond to area 122 in FIG. 6), and if the data set 112 indicates a 100 mph (161 kph) value, the data set 112 is displayed at a second end area 158 (for example, the end area might correspond to area 124 in FIG. 6). For data set values in between the range end points, the display of the data set is proportionally moved between the two end point areas 156, 158 (as indicated by the horizontal dashed arrows in FIG. 7).

The effective path of movement of a displayed data set may be a linear path, e.g., linear horizontal as implied in FIG. 7, linear vertical, or linear diagonal. Alternatively, the effective path of movement of a displayed data set may be a non-linear path. An example of a curved path of movement is shown in FIG. 6. Multiple or complex paths of movement may also be utilized, e.g., the displayed data set "jumps around" to different areas.

The correspondence between assessed priority level and display position may be linear. For example, in the case of an implied priority level as in FIG. 7 and FIG. 8, the range 160 would be linearly correlated to the length of display space between the two end areas 156, 158. Thus, for a given change in the value of the data set, the display position of the data set would move a corresponding amount. For example, if the data set value changed by 50% of the total data range 160, the displayed data set would be moved from its current position to a new position, where the new position is spaced apart from the current position by 50% of the total display length between the end points 156, 158.

Figure 9:
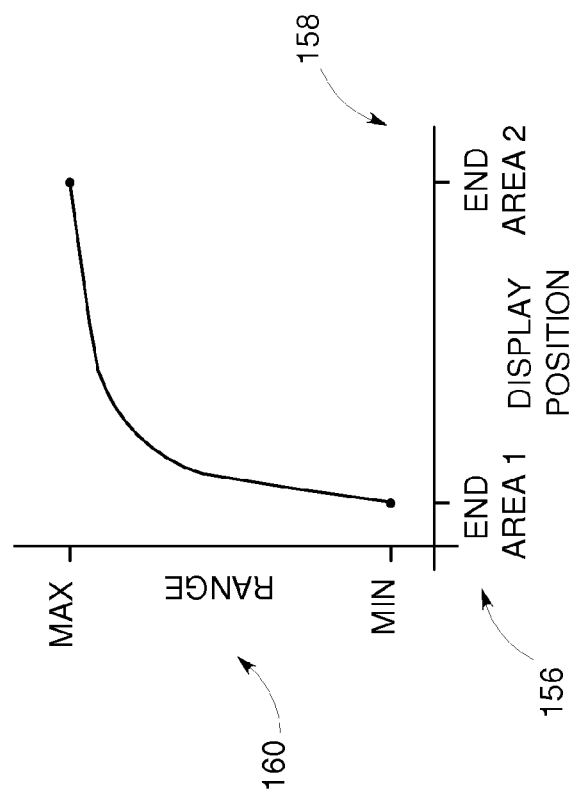

Alternatively, the correspondence may be non-linear, in which case the display control unit 118 controls the projector 104 to position a data set 112 non-linearly proportional to the assessed priority level of the first data set. In such an embodiment, certain changes to the assessed priority level (implied assessment or active assessment) result in movement of the data set display a first distance, whereas other changes of a similar magnitude result in movement of the data set display a second, significantly larger distance, as indicated in FIG. 9. Such a configuration is useful for situations where it is desired to bring a particular data set to an operator's attention only if the assessed priority level of the data set is approaching a highest-priority value or state within a range. In one example, with reference to FIG. 6, a data set 112 relating to a signal status is displayed in a first area 122 if the signal status is "green" (lowest priority) or "yellow" (intermediate priority). However, if the signal status is "red" (highest priority), the data set 112 is displayed in the second area 124.

In any of the embodiments described herein, the display control unit 118 may be further configured to control the projector 104 to change a display format of a data set 112 when the displayed data set 112 is moved from one area 122 to another area 124. "Display format" refers to the appearance of a data set as viewed by an operator, examples of which include color, brightness, level of transparency, size and shape of the displayed elements, activation or deactivation of animation (e.g., flashing), and the like. Thus, in regards to a data set 112 moved from display at one area 122 to another 124, the projector is controlled so that the displayed data set 112 has a first display format at the first area 122 and a second display format at the second area 124, where the second display format is different than the first (as discernable by a human operator viewing the displayed data set at the two areas). The display format of a particular data set may be changed each time it is moved to a different area, or only when the data set is moved to a particular designated area, or otherwise. Also, the change in display format may be abrupt, or it may be gradual or progressive, based on position or otherwise. For example, with reference to FIG. 6, if a displayed data set 112 is moved from area 122 (lowest assessed priority level), then to areas 154a and 154b, and finally to area 124 (highest assessed priority level), the display format of the data set may include a blue color when the data set is displayed at areas 122, 154a, or 154b, and a red color when the data set is displayed at area 124. (Based on common usage, red and other bright colors are often associated with higher priority or warning levels, however, there is no requirement in the system 100 that particular colors or classes of colors be used for particular priority levels or ranges or priority levels.)

The display format of a displayed data set may change or be based on factors other than display position. For example, the display format of a displayed data item may be based on a rate of change of the data item (e.g., very fast vehicle deceleration results in a display format change of vehicle speed from a current color to red), or on external data. As an example of the latter, one of the data sets 112 may relate to a signal external to the vehicle (e.g., rail wayside signal, traffic signal), with the projector being controlled so that the color of the data set is changed to match the current color of the signal.

As should be appreciated, the heads up display 110 generated by the projector 104 comprises whatever data sets 112, 114 and other, non-data elements are projected by the projector onto the windscreen 116 at a particular point in time. In each of FIGS. 1 and 6, the heads up display 110 is illustrated as comprising a delineated rectangle. However, this is merely to indicate a designated maximum region or extent of the heads up display on the windscreen. In particular, it may be the case that the projector 104 and display control unit 118 are configured so that data sets 112, 114 (and other elements) are projected onto each quadrant (or other sub area) of the windscreen. However, in other embodiments, and in regards to certain types of vehicles, it may be desirable to avoid displaying data sets and other elements in particular regions of the windscreen. For example, with respect to FIG. 6, for a windscreen 116, the heads up display 110 includes a right side region 162 for display of data sets with lower assessed priority levels, a bottom center region 164 for display of data sets with higher assessed priority levels, and a center region 166 in which no data sets or other elements are displayed, to avoid obscuring an operator's view through this portion of the windscreen. (It being assumed, in this example, as would typically be the case, that the region 166 is the area that the operator would most often look through for viewing the vehicle's progress along a path of travel of the vehicle.) Thus, for the case where the display of a data set 112 is moved from a first area 122 of a windscreen 116 to a second area 124 of the windscreen based on the assessed priority level 126 of the data set 112, in one embodiment the first area 122 is at a periphery of the windscreen 116 and the second area 124 is located closer to a center of the windscreen than the first area. (The center may be defined in certain embodiments at the geometrical center point 168 of the windscreen, or in other embodiments as a vertical center line 170 of the windscreen.)

The heads up display 110 generated by the projector 104 includes various display elements ("display element" simply referring to something that is displayed). The display elements include one or more displayed data sets 112, 114, and possibly one or more non-data elements (discussed below). Each data set includes one or more data items 117, each of which conveys information to a vehicle operator relating to vehicle operation or operation of the system 100. A data set may be active, meaning that the underlying data items of the data set are subject to change based on information received from the vehicle control system 120 or otherwise. ("Underlying" meaning the data item as electronically stored in the display control unit or otherwise, and apart from how and where the data set is displayed.) Other data sets may be static, meaning that the underlying data items of the data set do not change. Examples include instructions and other static text, warning graphics, and the like. However, even though an underlying data item of a static data set does not change, it may still in effect convey different information to an operator based on the display format and location of the static data set. For example, one static data set might be a warning graphic. A priority level of the warning graphic would be assessed relative to operation of the vehicle, that is, for one mode or state of vehicle operation the warning graphic would be impliedly assessed as having one priority level, and for another mode or state of the vehicle the warning graphic would be impliedly assessed as having another priority level. The display location and format of the warning graphic would then be based on the assessed priority level. For example, the warning graphic might be displayed in a yellow color and at a first area in the periphery of a windscreen (area 122 in FIG. 6) when a potential system failure/fault is recognized in the vehicle control system 120, and the warning graphic might be displayed in a red color and at a second area in the center area of the windscreen (area 124 in FIG. 6) when the system failure/fault actually occurs.

The heads up display 110 may include display elements other than data sets 112, specifically, non-data elements. A "non-data" elements is defined as a display element that does not include information relating to vehicle operation or operation of the system 100. Examples include display elements that do not contain any information per se, e.g., display "anchors" and other aesthetic graphic elements, and display elements that contain information unrelated to vehicle or system operation, e.g., company or service provider logos or trademarks.

The display system 100 may be configured so that any displayed elements or information of the heads up display 110 are not in a format that may cause confusion to the operator in regards to possible external conditions. For example, depending on the type of vehicle in question, designated routes of travel, designated traffic signals, etc. it may be desirous not to utilize, or only to carefully utilize, certain displayed colors, such as red or green. Additionally, the display system may be configured so that when the display system enters a failure or fault mode, it is assured that certain colors, symbols, etc. are not displayed. One example, in the context of a rail application, may be to configure the display system so that a green-only display or other green colors (indicative of a "clear" or "proceed" condition) are not displayed by default during a failure or fault mode.

As indicated, if the heads up display 110 includes plural data sets 112, 114, any of the data sets may be processed and displayed as set forth herein, depending on a desired system configuration. Thus, in one embodiment, the display control unit is configured to control the projector for moving a first data set from a first area of the windscreen to a second area of the windscreen, based on an assessed priority level of the first data set. Additionally, the display control unit is configured to control the projector for moving a second data set from a third area of the windscreen to a fourth area of the windscreen, based on an assessed priority level of the second data set. Typically, an operator prominence level of the second data set, when displayed at the fourth area, is greater than an operator prominence level of the second data set when displayed at the third area. This embodiment, therefore, involves generating a heads up display of the second data set on a third area of the windscreen, assessing a priority level of the second data set relative to operation of the vehicle, and, based on the assessed priority level of the second data set, moving the display of the second data set from the third area to a fourth area of the windscreen.

The data sets may be assessed relative to one another, for movement purposes and/or for assessing changes in display format. For example, in the case where first and second data sets are displayed at first and second areas, respectively, if the two data sets are assessed and the first data set is assessed as having a higher relative priority level than the second data set, then the display of the first data set could be moved to a third area, while the second data set is left in place. Conversely, if the first data set is assessed as having a lower relative priority level than the second data set, then the display of the first data set could be left in place while the second data set is moved to the third area. Thus, where a first data set is displayed at a first area and may be moved to a second area based on assessed priority level, one embodiment involves generating a heads up display of a second data set on a third area of the windscreen, assessing a priority level of the second data set relative to operation of the vehicle, and, if the assessed priority level of the second data is greater than the assessed priority level of the first data set, moving the display of the second data set from the third area to the second area, instead of the first data set.

With reference to FIG. 1, certain embodiments of the present invention relate to generating separate heads up displays on multiple windscreens, e.g., a first heads up display 110 on a first windscreen 116 and a second heads up display 172 on a second windscreen 174, using multiple coordinated projectors or the like, as discussed further below in more detail. One purpose for doing so may be to display lower priority level data sets on one windscreen, and to then move the data sets to a different windscreen as their priority level increases and/or rises above a particular threshold. (Typically, the operator prominence level of the original windscreen, where the data sets are displayed when they have a lower priority, is lower than an operator prominence level of the other windscreen.) Thus, one embodiment of the present invention relates to a method for displaying information to a vehicle operator. The method comprises generating a heads up display 110 of a first data set 112 on a first area 122 of a first windscreen 116 of a vehicle 108. (See Step 136 in FIG. 2.) The method further comprises generating a heads up display 172 of a second data set 176 on a second windscreen 174 of the vehicle 108, and assessing a priority level of the second data set relative to operation of the vehicle. Based on the assessed priority level of the second data set, the display of the second data set 176 is moved from the second windscreen 174 to a third area 178 on the first windscreen 116. Typically, the displayed second data set 176 is discontinued as part of the second heads up display 174 and re-initiated as part of the first heads up display 110, in the third area 178 of the first windscreen 116. Alternatively, animation or screen movement effects may be used to make it appear to an operator that the displayed data set 176 moves across the second windscreen 174 and then across the first windscreen 116. Any of the other movement methods/effects described herein may also be utilized, e.g., moving the displayed data set 176 to plural intermediate areas on the first or second windscreens based on assessed priority level.

Figure 10:
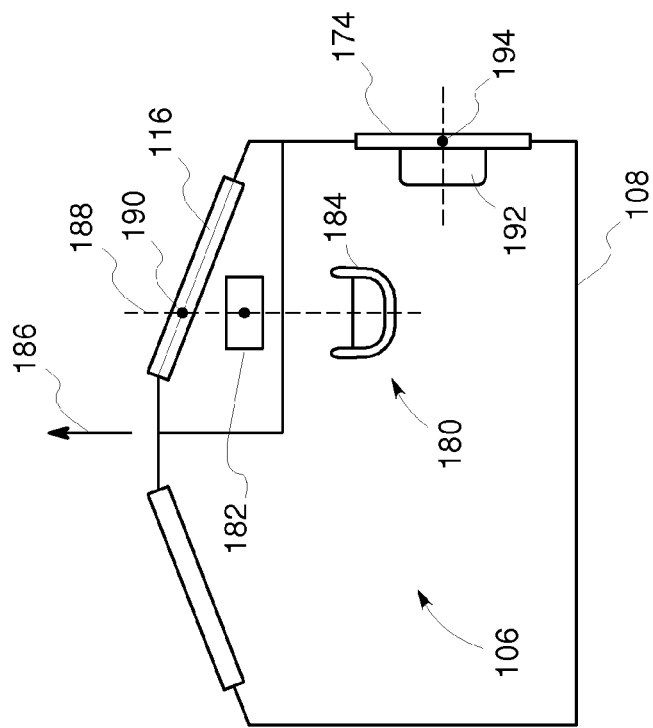
FIG. 10 is a schematic diagram of the interior of a vehicle and operator cab.

As noted above, in one embodiment of the system 100 a displayed data set is moved from a first area 122 of a windscreen 116 to a second area 124 of the windscreen based on assessed priority level. The data set has an operator prominence level 128 when displayed at the second area 124, and another, different operator prominence level 130 when displayed at the first area 122. (Typically, the operator prominence level 128 at the second area is greater than the operator prominence level at the first area 122.) "Operator prominence level" is defined as a relative degree or extent to which an operator is likely to view an area of the windscreen (e.g., an area where a data set 112, 114 might be displayed) when operating the vehicle. Typically, this will be based upon the designated sitting/control location for the operator, in relation to the windscreen, when the vehicle is in operation. For example, with reference to FIG. 10, for most vehicles 108 the operator station 180 (including location of primary controls 182 and seating 184) will align with the front windscreen 116 and primary motive axis 186 of the vehicle. In particular, a primary axis 188 of the operator station 180 (defined by the seating 184 in relation to the primary controls 182) will typically be generally aligned with the primary motive axis 186 (coaxial with or parallel thereto), allowing the operator to simultaneously sit at the seating 184, view and utilize the controls 182, and look out the windscreen 116 for viewing the area in front of the vehicle's direction of travel. Thus, in the example in FIG. 10, the area of the windscreen 116 with the highest operator prominence level is the area around a vertical line through the windscreen that is normal to the axis 188, as at 190. (The line normal at point 190 may or may not be the actual centerline of the windscreen.) The further an area is aware from this line, the lower its operator prominence level. The primary motive axis is the mechanical "neutral" or default position of the vehicle's navigation system, that is, the direction that the vehicle would travel in upon startup, when in a particular vehicle mode, unless controlled to the contrary. Examples include the longitudinal axis of an automobile, off-highway vehicle, or locomotive, which corresponds to "forward" and "reverse," e.g., the primary motive axis of a typical automobile is equivalent to its longitudinal axis, because the automobile moves in a direction along its axis when its navigational system (wheels and steering) are in neutral.

As should be appreciated, operator prominence level is a relative measure, and may be tied in certain contexts to factors other than vehicle operation and vehicle axis or direction of travel. For example, again with reference to FIG. 10, there may be an auxiliary control or information station 192 in front of a side window 174. Here, even though the operator will most typically be viewing the area around point 190 of the front windscreen 116 when the vehicle is in operation, there may be times when the operator accesses the auxiliary controls 192. Within the context of the relationship of the auxiliary controls 192 to the side window 174, and not taking the front windscreen 116 into consideration, the area around a vertical line (through the side window) normal to point 194 might be the area of the side window 174 with the highest operator prominence level.

Depending on the type of vehicle in question, the positioning of a heads up display 110 may be such that the heads up display is visible to multiple operators and/or other persons in the vehicle, and at a number of different possible seating locations. For example, in the case of a locomotive, it may be desired for the display to be visible from the normal seated position of the locomotive operator, from the normal seated position for the locomotive conductor, from forward and rearward seating positions for the locomotive operator, and all positions in between, and from low and high seating positions for the locomotive operator and all positions in between. Alternatively, for some types of vehicles, it may be desired to restrict viewing of all or part of the heads up display only to a person in the vehicle operator position. The particular viewing angles for a given implementation of a heads up display will depend the vehicle in question, the position and configuration of display surface, operator or other viewer orientation, a desired extent of visibility of the heads up display within the operator cab, etc.

Figure 12:
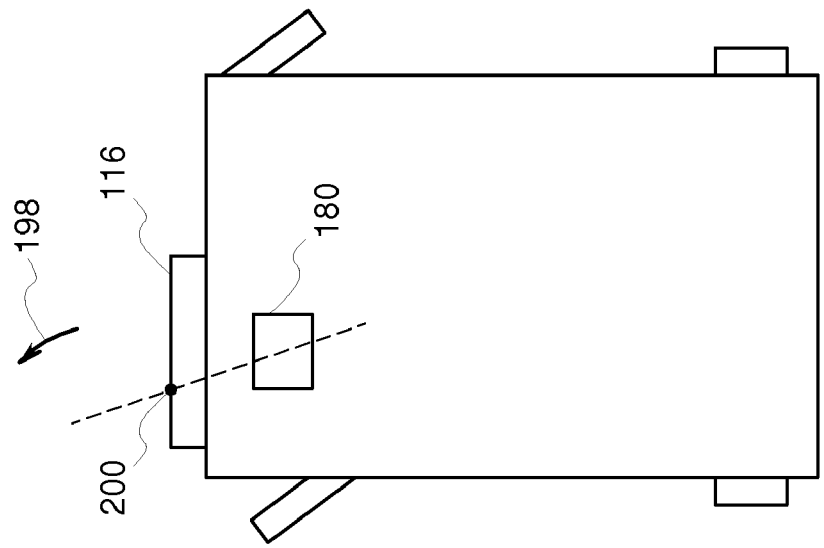
FIGS. 11 and 12 are schematic top plan views of a vehicle.
Figure 11:
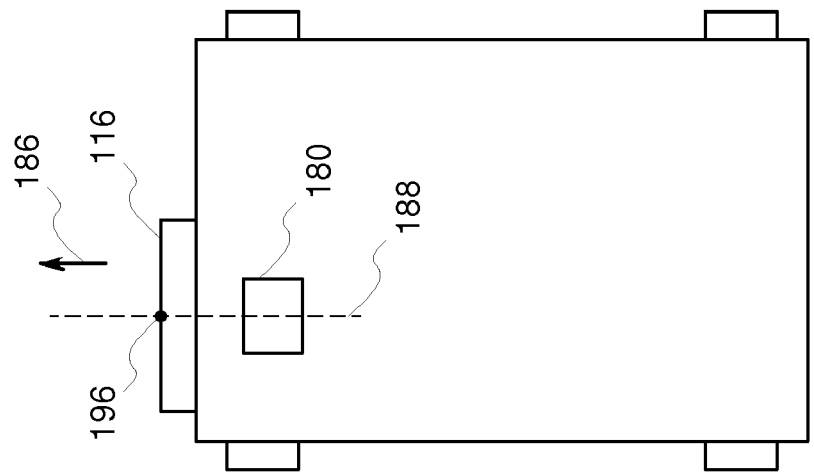

Vehicle direction of travel, status/position of navigation equipment (steering, rudder, etc.), and the like may be taken into consideration when positioning or moving data sets 112 on a windscreen 116. FIGS. 11 and 12 provide one example. In FIG. 11, an off-highway vehicle or automobile 108 is traveling in a forward direction 186. The axis 188 of the operator station 180 is aligned with the direction of travel, and the windscreen area with the highest operator prominence level is the area around the vertical line defined by point 196. (In other words, because the vehicle is moving forward, and further because of the setup/arrangement of the operator station, the operator is most likely or often to view the area around point 196 during ongoing operations of the vehicle.) However, if the vehicle turns, as in FIG. 12, in a direction indicated by arrow 198, it is likely that the operator will look in the direction of the turn, off-axis of the operator station axis 188. Thus, the windscreen area with the highest operator prominence level may shift to the area around the vertical line defined by point 200, in the direction of the turn. This may be taken into account when positioning or moving displayed data sets 112, specifically, a data set that would normally be displayed in one location 196 during a first navigational state may be shifted to another location 200 during a second navigational state. For example, as discussed above, when a vehicle makes a turn, a displayed data set may be shifted in the direction of the turn.

Figure 13:
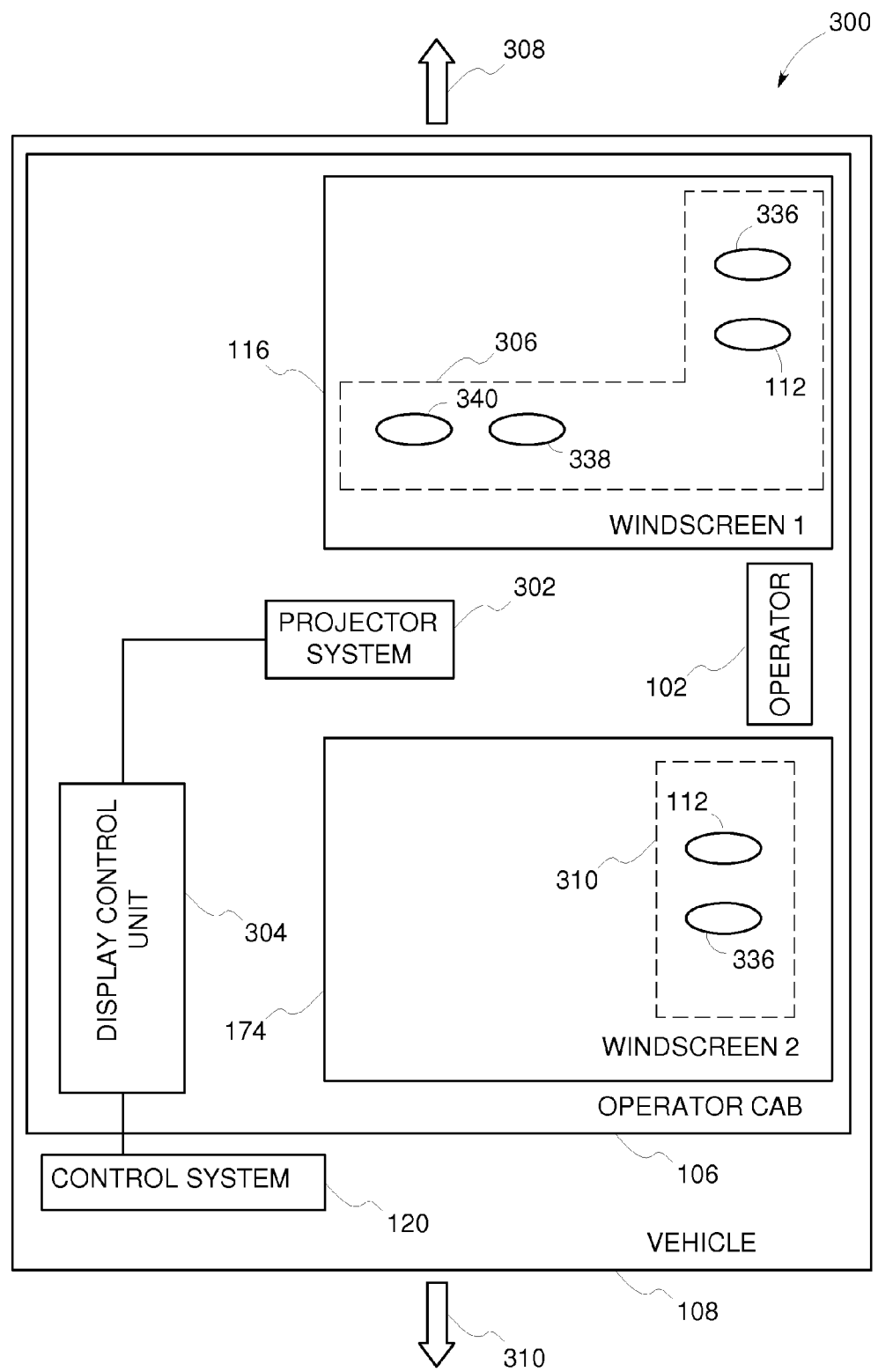
FIG. 13 is a schematic diagram of another embodiment of a display system for displaying information to a vehicle operator.

With reference to FIG. 13, another embodiment of the present invention relates to a display system 300 for displaying information to a vehicle operator 102. The display system 300 comprises a projector system 302 positioned in an operator cab 106 of a vehicle 108. The display system 300 additionally comprises a display control unit 304 connected to the projector system 302 and to a control system 120 of the vehicle 108. The display control unit 304 is configured to control the projector system 302 for projecting a first heads up display 306 on a first windscreen 116 of the vehicle 108 when the vehicle is traveling at a first orientation 308 of the vehicle. The display control unit 304 is further configured to control the projector system 302 for projecting a second heads up display 310 on a second windscreen 174 of the vehicle when the vehicle 108 is traveling at a second orientation 312 of the vehicle. The first and second heads up displays 306, 310 each include respective information relating to operations of the vehicle, e.g., displayed data sets 112. "Vehicle orientation" refers to a geometrical arrangement of the vehicle with respect to a direction of travel of the vehicle. For example, for a mining truck traveling in a direction "A," the mining truck would be at a first vehicle orientation 308 if traveling in a "drive" gear with the front of the truck leading, and would be at a second, different vehicle orientation 312 if traveling in a "reverse" gear with the back of the truck leading, either if traveling in that same direction "A" or a different direction.

Figure 14:
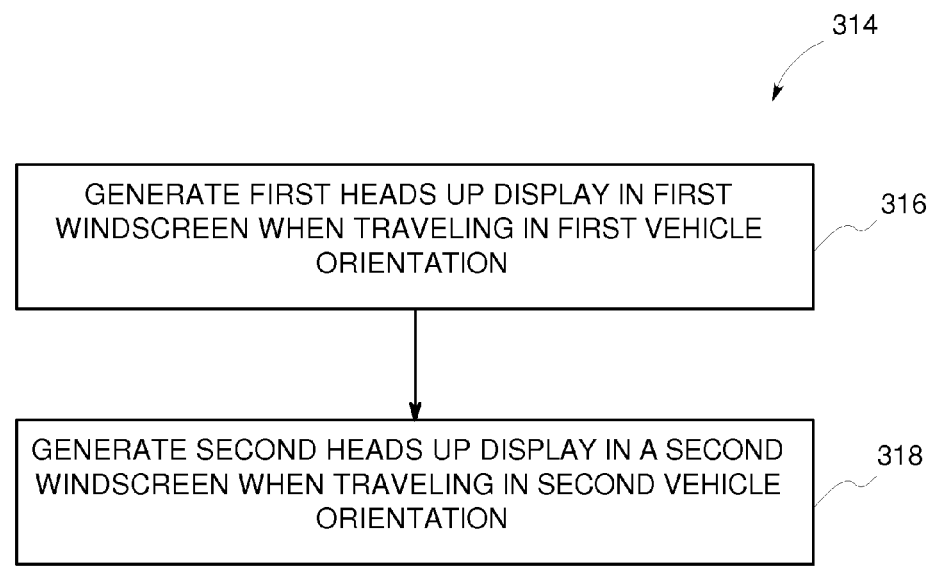
FIG. 14 is a flowchart showing another embodiment of a method for displaying information to a vehicle operator.

Thus, with reference to FIG. 14, another embodiment of the present invention relates to a method 314 for displaying information to a vehicle operator. The method comprises generating a first heads up display on a first windscreen of a vehicle, when the vehicle is traveling at a first orientation of the vehicle, at Step 316. The method further comprises generating a second heads up display on a second windscreen of the vehicle, when the vehicle is traveling at a second orientation of the vehicle, at Step 318.

As should be appreciated, generating a heads up display in one windscreen when traveling at one vehicle orientation, and generating a heads up display in another windscreen when traveling at another vehicle orientation, allows the display system to tailor the location of a heads up display to the windscreen that the operator will most often view during a particular mode of vehicle travel. For example, in one embodiment the first windscreen 116 is a front windscreen of the vehicle 108, and the second windscreen 174 is a rear windscreen of the vehicle (or a windscreen oriented towards the rear of the vehicle). Here, an operator orientation of the first windscreen is located at an angle of about 180 degrees with respect to an operator orientation of the second windscreen, that is, an operator must turn 180 degrees to switch from directly viewing one windscreen to the other. When the vehicle is traveling forward (i.e., the front of the vehicle is leading), a heads up display 306 is generated in the front windscreen; it is presumed that the operator will most likely or most often be looking through the front windscreen when the vehicle is traveling forward. However, when the vehicle is traveling in reverse, or otherwise with the rear of the vehicle leading, a heads up display 310 is generated in the rear windscreen 174. Again, it is presumed that when the vehicle is traveling in reverse, the operator will most likely or most often be looking through the rear windscreen 174.

Figure 15:
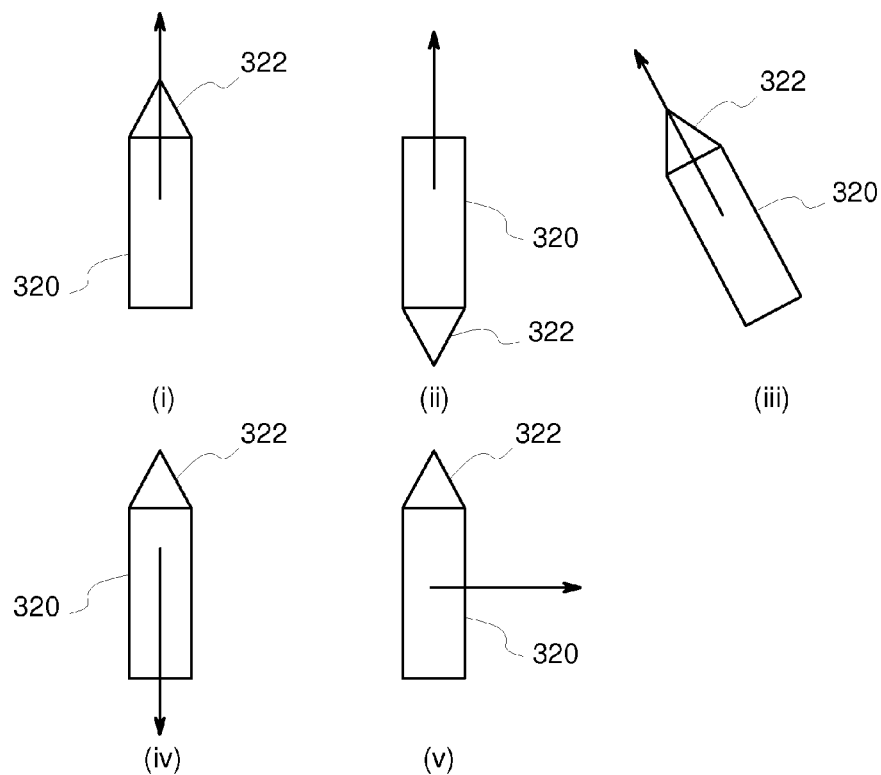
FIG. 15 (subparts (i)-(v)) shows schematic top plan views of a vehicle.

"Vehicle orientation" is further explained with reference to FIG. 15 (comprising subparts (i)-(v)). In particular, FIG. 15 shows a vehicle 320 in schematic form. The vehicle 320 includes a vehicle front 322. The arrow in each subpart represents a direction of travel. Since "vehicle orientation" refers to a geometrical arrangement of the vehicle with respect to a direction of travel of the vehicle, subparts (i) and (iii) are the same vehicle orientation, even though the vehicle is traveling in different directions. That is, the arrangement of the vehicle with respect to the direction of travel has not changed in subparts (i) and (iii). However, each of subparts (ii), (iv), and (v) is at a different vehicle orientation than subparts (i) and (iii), and from each other. For example, in regards to subparts (i) and (iv), the vehicle orientation (with respect to an external frame of reference) has not changed, but the direction of travel has changed. Meaning the geometrical arrangement of the vehicle with respect to a direction of vehicle travel is different in subpart (i) than in subpart (iv). The same is true between subpart (i) and (v), and between subpart (iv) and (v). Subparts (i) and (ii) illustrate that the vehicle may be traveling in the same direction, but have a different vehicle orientation due to the geometrical arrangement of the vehicle having changed with respect to a direction of vehicle travel.

In another embodiment of the display system 300, the heads up display 306 on the first windscreen 116 is deactivated when the vehicle 108 is traveling at the second orientation 310 of the vehicle. Additionally, the heads up display 310 on the second windscreen 174 is deactivated when the vehicle 108 is traveling at the first orientation 308 of the vehicle. This reflects the situation where it is deemed not necessary to generate a heads up display in a particular windscreen unless the vehicle is traveling at a particular vehicle orientation. For example, if a vehicle 108 is traveling at a forward orientation 308, it may not be necessary to generate a heads up display in the rear windscreen 174, since it is less likely that the operator will be guiding the vehicle by primarily looking through the rear windscreen.

Figure 16:
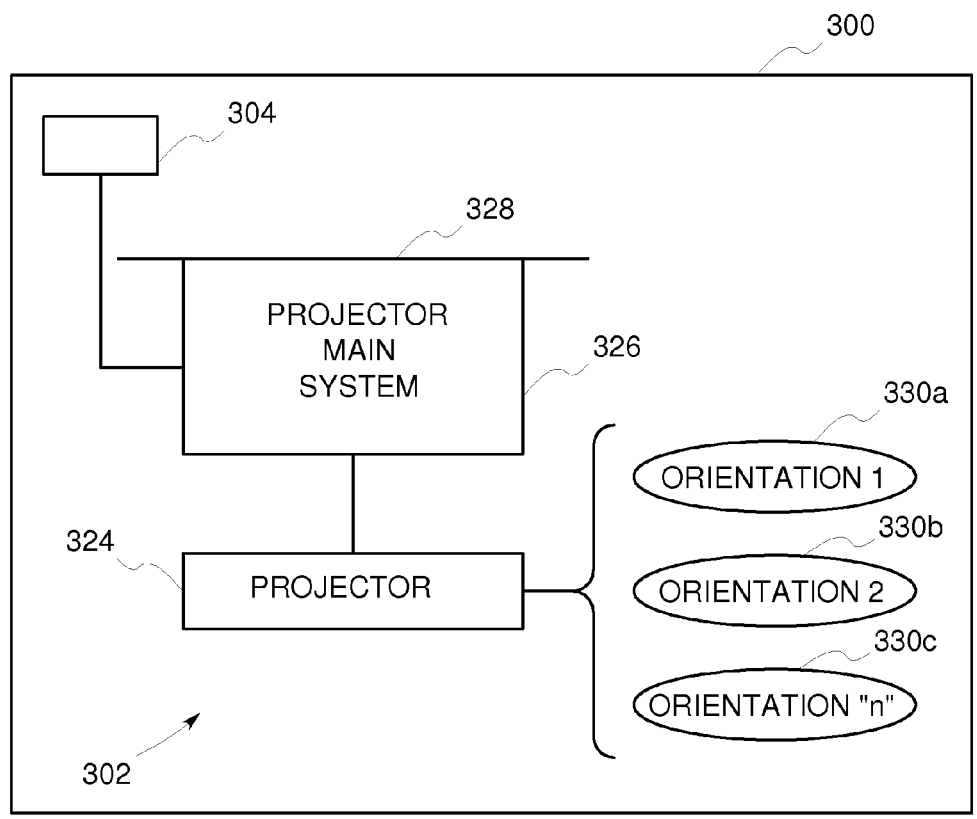
FIGS. 16-18 (FIG. 18 including subparts (i) and (ii)) are schematic diagrams showing various details of the display system shown in FIG. 13, according to three different embodiments of the present invention.

In another embodiment of the display system 300, with reference to FIG. 16, the projector system 302 comprises a projector 324. The display system 300 further comprises a projector mount system 326 connected to a surface 328 of the operator cab 106. The projector 324 is attached to and supported by the projector mount system 326. The projector mount system 326 is electrically controllably for non-manual movement of the projector to a plurality of different projector orientations 330a, 330b, 330c, through an electrical connection to the display control unit 304 or otherwise. (The projector mount system may also be configured to allow an operator to manually move the projector.) The display control unit 304 is configured to control the projector mount system 326 to orient the projector 324 (e.g., at orientation 330a) for projection of the first heads up display 306 on the first windscreen 116 when the vehicle 108 is traveling at the first orientation 308 of the vehicle, and to control the projector mount system 326 to re-orient the projector 324 (e.g., at orientation 330b) for projection of the second heads up display 310 on the second windscreen 174 when the vehicle 108 is traveling at the second orientation 310 of the vehicle.

Figure 17:
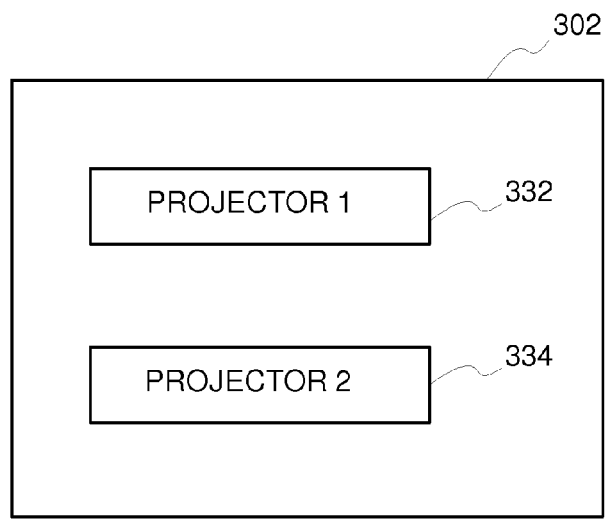

In another embodiment of the display system 300, with reference to FIG. 17, the projector system 302 comprises two projectors 332, 334. A first of the two projectors 332 is configured (e.g., positioned) for projection of the first heads up display 306 on the first windscreen 116. The second of the two projectors 334 is configured (e.g., positioned) for projection of the second heads up display 310 on the second windscreen 174.

As noted above, each heads up display 306, 310 will include the display of one or more data sets 112 or other display elements. In one embodiment, what is displayed as part of the second heads up display 310 is a subset of what is displayed as part of the first heads up display 306. In this embodiment, therefore, the first heads up display comprises a plurality of data sets each relating to a different aspect of vehicle operations, and the second heads up display comprises at least one of the plurality of data sets of the first heads up display, but fewer than all the plurality of data sets of the first heads up display. For example, as shown in FIG. 13, the second heads up display 310 includes data sets 112 and 336, which are also displayed as part of the first heads up display 306, but not data sets 338, 340. Such configurations may be used where it is desired to show more information to an operator when the vehicle is traveling at one vehicle orientation (e.g., vehicle front end leading), and/or where only a reduced amount of information is required or desired when the vehicle is traveling at another vehicle orientation (e.g., vehicle rear end leading). As one example, travel at the second vehicle orientation may be a secondary or supplemental mode of travel, e.g., travel in reverse, where it is only necessary to show vehicle speed information and perhaps signal status.

Figure 18:
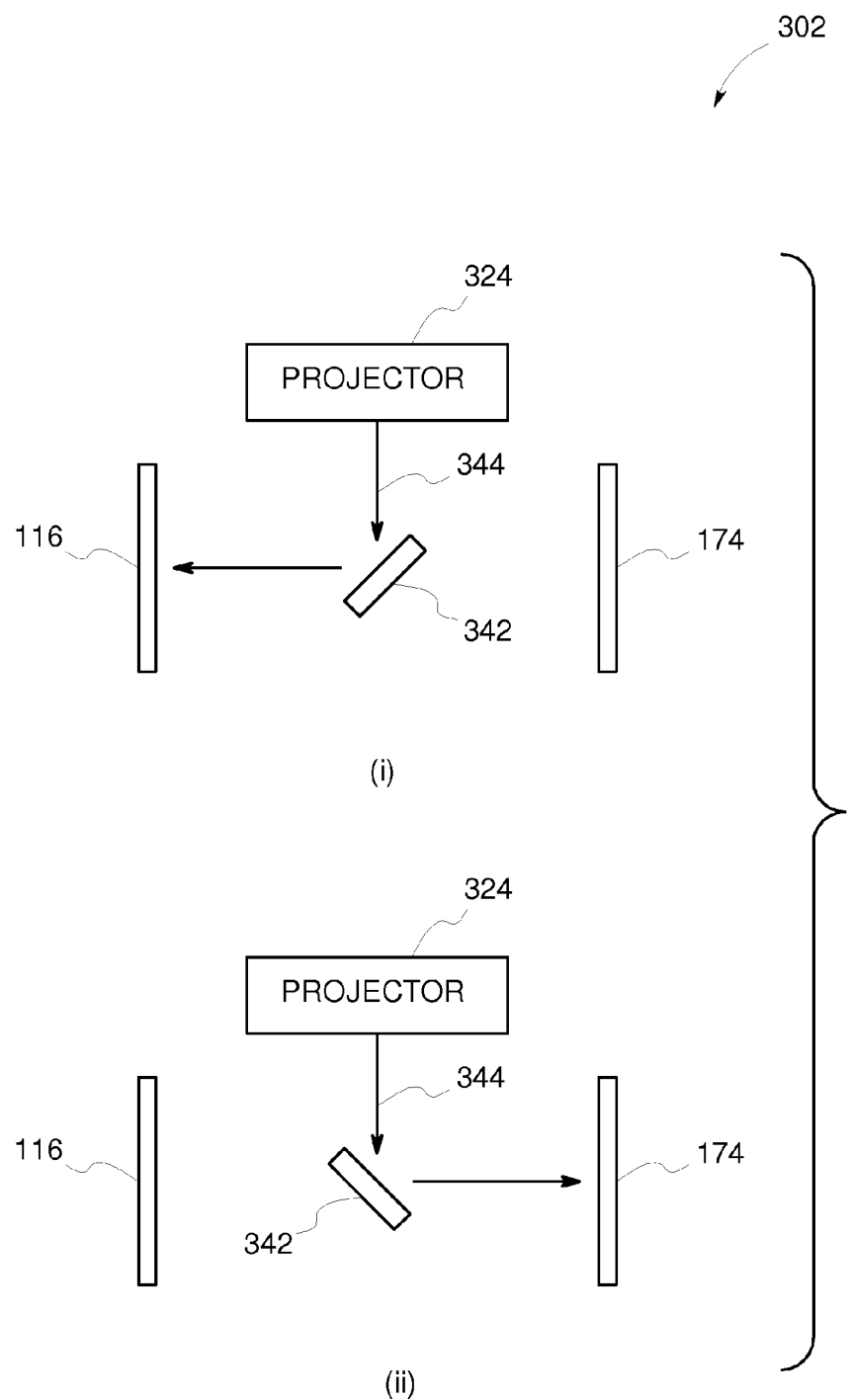

With reference to FIG. 18 (including subparts (i) and (ii)), instead of using two projectors or repositioning a projector, an embodiment of the display system involves selectively generating (e.g., projecting) a respective heads up display on two different windscreens, with one fixed-position projector, by using an output redirection device 342 for controllably redirecting the light output of the projector. In this embodiment, the projector system 302 would comprise a projector 324, and the display system 300 would further comprise an output redirection device 342 operably coupled to the projector 324. The output redirection device 342 would be electrically controllable for redirecting the light output 344 of the projector. The display control unit 304 would be configured to control the output redirection device 342 for projection of the first heads up display on the first windscreen 116 when the vehicle is traveling at the first orientation of the vehicle (FIG. 18, subpart (i)), and to control the output redirection device 342 for projection of the second heads up display on the second windscreen 174 when the vehicle is traveling at the second orientation of the vehicle (FIG. 18, subpart (ii)). The output redirection device might include an electrically repositionable mirror unit, an electrically controllable prism unit, an electrically controllable light pipe, or the like.

Figure 19:
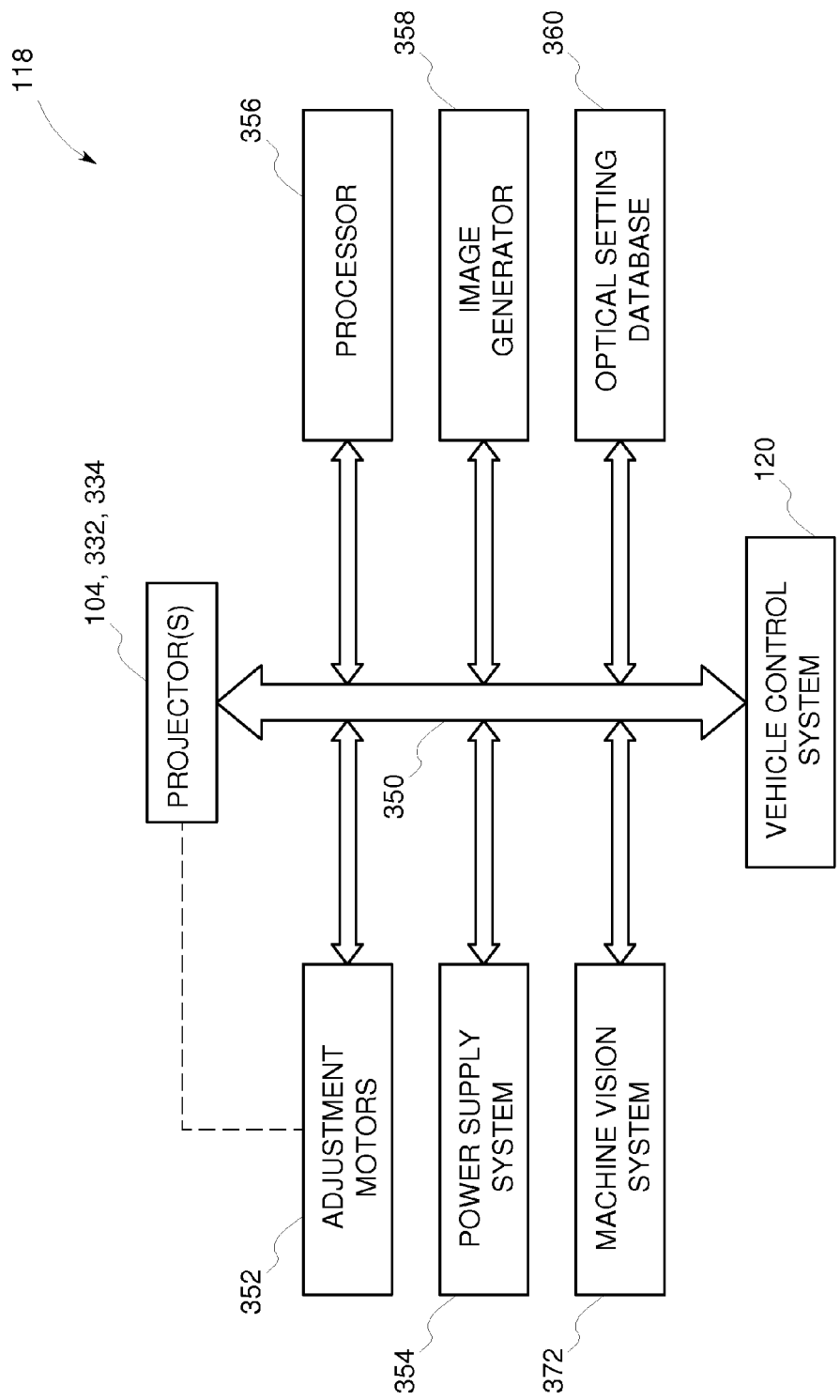
FIG. 19 is a schematic diagram of a display control unit and related elements.

FIG. 19 shows various elements that may be part of the display control unit 118, which controls the projector(s) to display a heads up display. (There may be one display control unit 118 for each projector, a single display control unit for multiple projectors, or a combination thereof, e.g., one display control unit that controls one projector and another that controls multiple additional projectors.) The elements shown are functional blocks, meaning that the indicated functions may be carried out by different entities within the display control unit and/or display system generally or by one entity within the display control unit and/or display system generally. Also, although the indicated element are shown as part of the display control unit, the indicated elements may be logically and/or physically part of other elements within the display system. For example, although the display control unit 118 is shown as including a power supply system 354, the power supply system may be separate from the display control unit (e.g., a power source from elsewhere in the vehicle. Further, although the power supply system is shown connected (directly or indirectly) to the projector(s), it may be the case that each projector has its own internal or external power supply.

The display control unit 118 comprises one or more electrical lines 350, one or more adjustment motors 352, a power supply system 354, a processor 356, an image generator 358, and an optical settings database 360. (Unless otherwise specified, the term "unit" is not meant to be limited to a stand-alone device or package, but instead refers more generally to a system.) The electrical lines 350 electrically interconnect the other elements in the display control unit 118 to one another, and also electrically interconnect the display control unit 118 to the projector(s) 104, 332, 334 and to the vehicle control system 120. The electrical lines 350 may include one or more power lines and one or more data or control lines; for simplicity of illustration, the lines 350 are shown grouped together. The power supply system 354 comprises one or more power supplies for supplying electrical power, in one or more designated formats, to one or more of the projectors, processor, adjustment motors, image generator, etc. The adjustment motors 352 are mechanically connected to the projectors 104, 332, 334 (as indicated by the dashed line in FIG. 19) for controllably adjusting one or more aspects of the projectors, such as position and physical orientation, focus, or the like. For example, there may be a base motor for turning the projector about a vertical or "Z" axis (i.e., yaw adjustment) and an angle motor for adjusting the tilt of the projector (i.e., pitch adjustment). The processor 356 (referring to any one or more of a computer or other micro-processor based unit, microcontroller, other set of electronic circuits configured for control purposes, etc.) receives vehicle data or other data from the vehicle control system 120, processes the data for assessing relative priority level or otherwise, if needed, and then presents the processed, assessed data to the image generator 358 in a designated format. The processor 356 may also include functionality (e.g., program instructions) for controlling the adjustment motors 352, either automatically or based upon operator input or other remote signals. The image generator 358, which may be another processor unit or software executed by the processor 356, receives data from the processor 356 and converts or otherwise processes the received data, if needed, for generation and projection of a heads up display (including all or part of the data) by the projector or projectors 104, 332, 334. For example, the image generator 358 may convert data/signals received from the processor 356 into a set of standard-format video input signals (e.g., VESA standard analog, 16-bit RGB video (RGB 5-6-5), or the like), which are then supplied to the projector or projectors 104, 332, 334. The type of video input signals presented to each projector is based on the video signal formats accepted by the projector.

The optical settings database 360 includes data accessible by one or more of the processor 356, the image generator 358, and the projector or projectors 104, 332, 334. The data in the optical settings database 360 may include information about each projector, such as projector specification information, which is used by the processor 356 and/or image generator 358 for processing data into a format suitable for the projector. Alternatively or in addition, the optical settings database 360 may include a set of instructions that is accessed by each projector (and/or by the processor 356) for establishing one or more operational settings of the projector. For example, the set of instructions may include a designated physical orientation/position of the projector, which the processor 356 uses for controlling the adjustment motors 352 to adjust the position/orientation of the projector. The set of instructions may also include focus settings, brightness settings, color correction or adjustment settings, settings for vertical or horizontal keystone correction, etc. As should be appreciated, the display system may be configured so that any of the aforementioned control settings may be set/adjusted based on operator command or input.

In some embodiments, a projector 104 is connected to a display control unit 118 via a multi-interface cable bus 362 (the multi-interface cable bus is shown schematically in FIG. 1). The multi-interference cable bus 362 comprises one or more cables acting as a video interface, a power interface, and a serial control interface or other control interface. The video interface provides a pathway for video/image signals. The power interface provides DC or other electrical power to the projector, as sourced from the power supply system 354 or otherwise. The control interface allows for the communication of control parameters to the projector, such as configurable software parameters, firmware/software updates, and other parameters as mentioned herein (focus settings, brightness settings, color correction or adjustment settings, settings for vertical or horizontal keystone correction, etc.) In one embodiment, the cable bus 362 is a single bundled group of cables, which eliminates the need to run multiple different cables to a projector. Instead, all data, power, and control communications/signals are sent over the single bundled group of cables.

The projectors and/or display control units may include an ambient light sensor and functionality for automatically adjusting projector brightness based on ambient light conditions. Additionally, the projectors and/or display control units may include a manual brightness adjustment that allows the operator to adjust the brightness manually by +/−30%, for example. Manual brightness adjustment may be accessible via mechanical rheostat input, by electronic/computer control through the projector control interface (based on user input), or otherwise.

The display control unit 118 and other components in the display system 100 may include Ethernet or other network interface modules for exchanging data with other components across a local area network or other network.

In one embodiment, the windscreens 116, 174 each comprise a clear glass and/or plastic window, through which an operator views surroundings external to the vehicle (for example). The surface of each windscreen on which a heads up display is projected (the display surface) may be outfitted with a display enhancement device, such as a semi-permanent, self-adhesive, transparent or translucent film for facilitating viewing of the projected elements on the display surface. That is, depending on the type and configuration of windscreen, light projected onto the windscreen may mostly pass through the windscreen and, thereby, the projected elements may not be visible (or sufficiently visible) to an operator. If that is the case, then the windscreen may be outfitted with a transparent or translucent film, which allows at least some light to pass through the film from external the vehicle (e.g., so as not to obscure the operator's view) but also enhances the degree to which projected light is viewable on the display surface. Alternatively, display surfaces (windscreens) may be outfitted with a permanent embedded glass film, or combiner glass display surfaces may be used. The type of display enhancement device used may depend on the type of vehicle in question, safety considerations, and government regulations. In one embodiment, display enhancement devices (devices used to enhance projection visibility on a display surface) do not tint the display surface (windscreen) or reduce the visibility through the glass, for example, in the case of a locomotive vehicle, in order to comply with FRA regulations. In another embodiment, the display enhancement devices comply with regulations as specified in U.S. federal government Title 49 (49 CFR 223 et seq.). The display enhancement device (surface film, embedded film, etc.) may be configured to enhance visibility of the heads up display in sunlight conditions, when sunlight is shining on or through the windscreen. In another embodiment, the display enhancement device (e.g., embedded or surface applied film) only reflects a selected wavelength of light as provided by the projector, for keeping the windscreen clear and avoiding extraneous reflections from other light sources.

Figure 20:
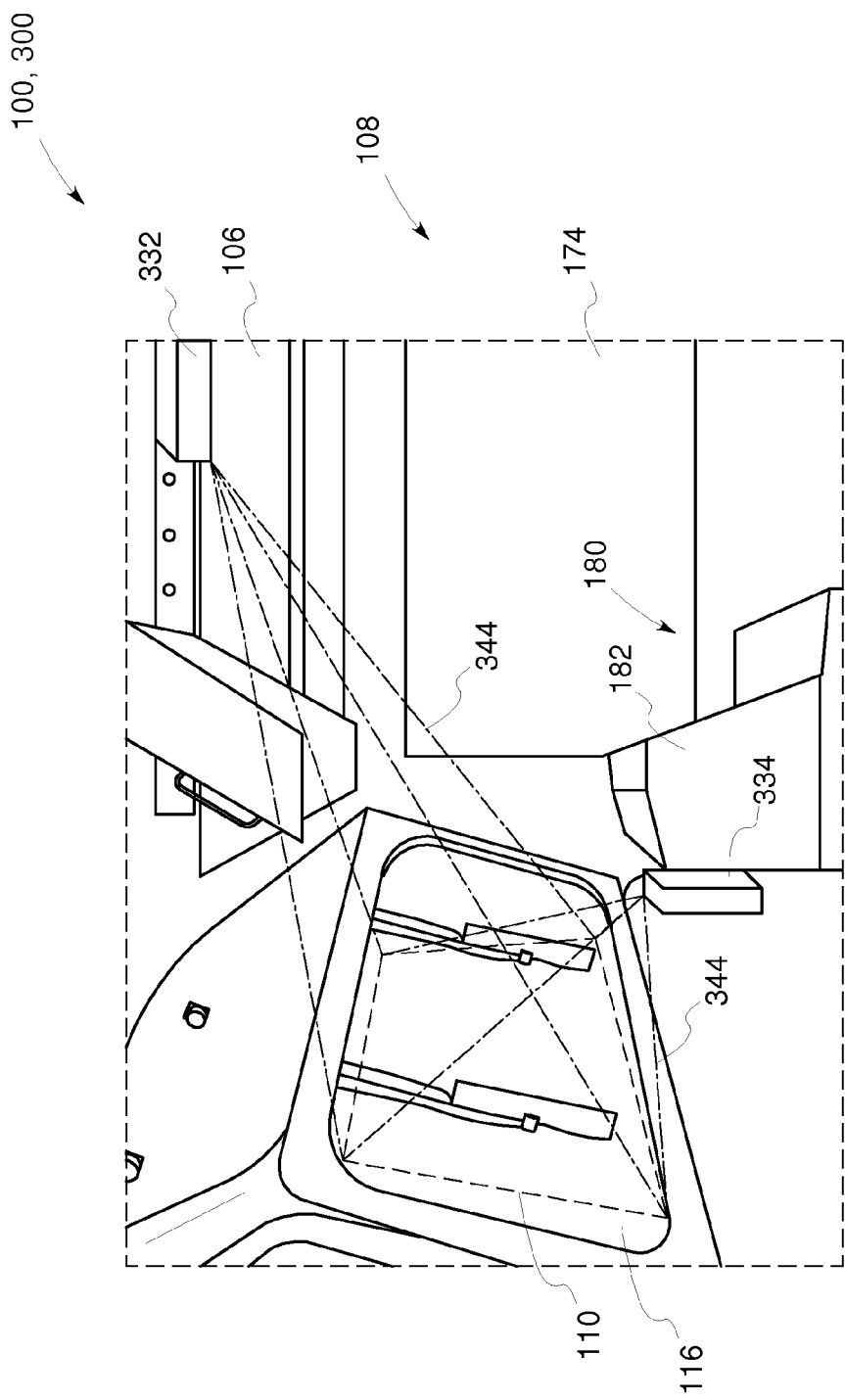
FIGS. 20 and 21 illustrate embodiments of projector positioning.
Figure 21:
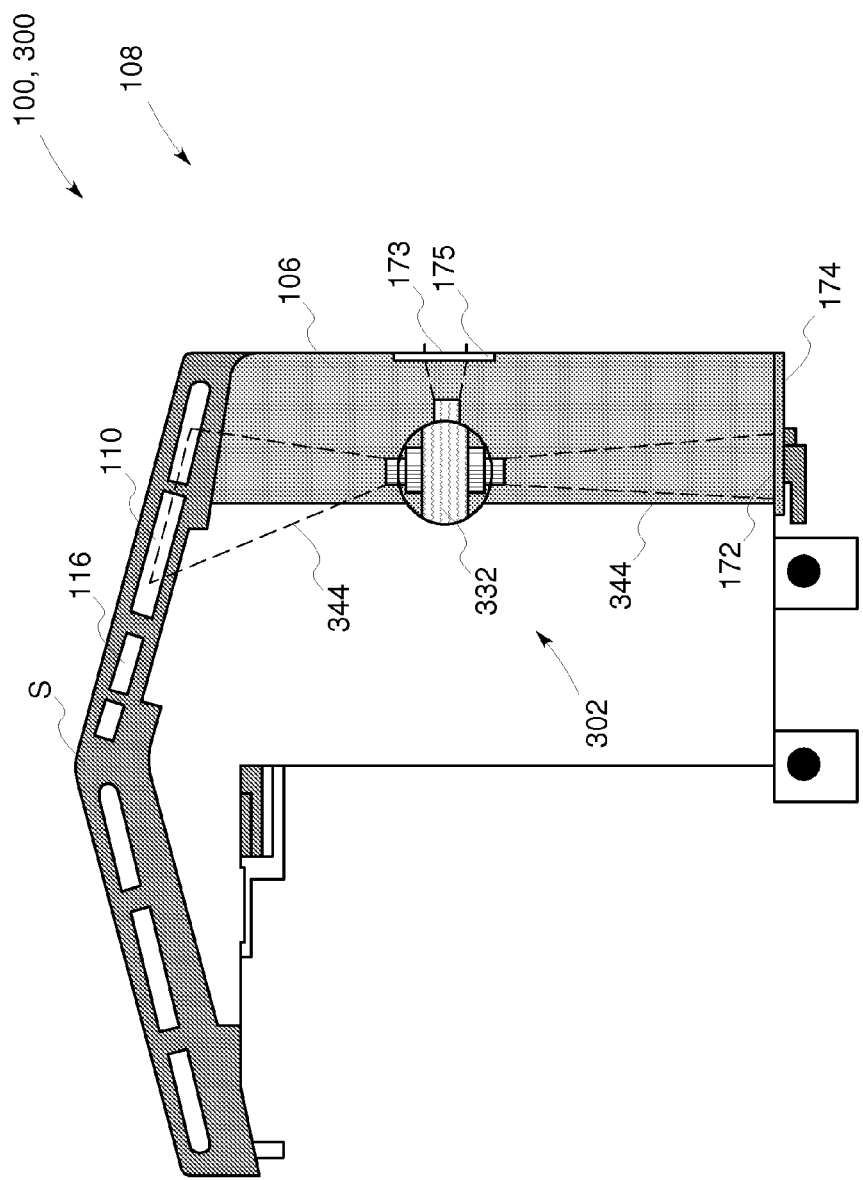

FIGS. 20 and 21 illustrate several possible position locations of a projector 104 in a vehicle, in this case a locomotive, according to various embodiments of the invention. As shown in FIG. 20, a projector 332 may be attached in a top mount configuration, wherein the projector 332 is attached to an interior ceiling, roof surface, headliner, etc. of the operator cab 106, generally above the area where the operator sits and in general alignment with a designated display surface, e.g., a front windscreen 116. That is, the projector 332 is positioned and aligned so that when the projector is energized and controlled for outputting light, its light output is incident upon the display surface. Alternatively or in addition, the display system 100 may include a projector 334 deployed in the operator cab 106 in a front mount configuration. The front mount projector 334 may be a "short throw"-type projector of the type configured to project light on a vertical (or inclined) surface above and very close to the projector. (Such projectors, which are commercially available, utilize optics systems and special video processing to ensure that projected light appears "normal" or "correct," e.g., minimal skewing or distortion, despite the fact that the projector is positioned at a non-typical orientation with respect to the display surface.) As indicated, the short thrown projector 334 may be positioned just behind an operator station 180, in front and below the windscreen 116 or other designated display surface.

FIG. 21 is a top plan view of a top mount projector 332 in an operator cab 106, according to one possible configuration of the display system 100. As in FIG. 20, the projector 332 is attached to an interior ceiling or roof surface of the operator cab 106, generally above the area where the operator sits and in general alignment with a designated display surface, e.g., a front windscreen 116. That is, the projector 332 is positioned and aligned so that when the projector is energized and controlled for outputting light, its light output is incident upon the display surface. In one embodiment, the display system 100 comprises a projector system 302 attached to an interior ceiling or roof surface of the operator cab 106. The projector system 302 includes one or more projectors. The projector system 302 is configured for simultaneous or alternating projection of a respective heads up display 110, 172, 173 on each of a plurality of windscreens 116, 174, 175 in the operator cab 106. For doing so, the projector system may comprise a separate projector for each heads up display, aligned with a respective windscreen onto which the heads up display is to be projected. Alternatively, the projector system may comprise a single projector with multiple light outputs, a single projector that is repositionable (via an adjustment motor 352 or the like) for alignment with a selected one of the any of the plurality of windscreens (e.g., when it is desired to project a heads up display on a particular one of any of the designated windscreens 116, 174, 175, the projector is repositioned for its light output to be aligned with the selected one of the windscreens), a single projector whose output may be controllably redirect using an optics system, a combination thereof, or the like. In the example shown in FIG. 21, if the projector system is a single, repositionable projector 332, the projector could be controllably repositioned for projecting a respective heads up display 110, 172, 173 on each of a front windscreen 116, a rear windscreen 174 (e.g., rear door window), and a side windscreen 175 in the operator cab 106, at alternate times.

In the embodiments shown in FIG. 21 or any of the other embodiments herein, the display control unit 118, 304 may include a heads up display control/configuration settings database (or other data structure). The heads up display control/configuration settings database lists one or more predefined heads up display format and configuration settings for each designated windscreen display surface and each projector (if more than one). Thus, for example, if a first designated windscreen has a first shape and dimensions, the heads up display control/configuration settings database would include data specifying one or more of: (i) how a designated projector should be positioned for projecting a heads up display on the first windscreen (assuming the projector is repositionable); (ii) the boundaries of the heads up display within the confines of the shape/dimensions of the windscreen, or, if the heads up display is meant to overshoot the windscreen (see FIG. 25), the boundaries of the heads up display with respect to another reference; (iii) the data sets, data items, display elements, etc. that are to be displayed as part of the heads up display on the first windscreen; (iv) control settings for that particular heads up display; (v) etc. In the case of a repositionable projector that is controlled to switch between different windscreens, the heads up display control/configuration settings database would be accessed each time a control input is received for switching from one screen to another screen, for determining and applying the control and configuration settings (such as those listed above) of the other screen.

The exact type and configuration of projectors used in the display system will depend on the vehicle in question, environmental conditions, budget, a desired or suitable level of functionality and performance, etc. In certain installations, consumer or business off the shelf components may be adapted, e.g., very small presentation projectors. In other installations, projectors may be purchased and adapted for use from commercial sources.

Although not shown in FIGS. 20 and 21 for clarity of illustration, each projector may be positioned within a projector housing. Additionally, it may be the case that each projector is attached to the operator cab by way of a projector mount, as described above with respect to FIG. 16. The projector mount may be an adjustable projector mount, wherein the projector is attached to the mount and the mount is moveable with respect to the operator cab for selectively adjusting the position and alignment of the projector, either manually or remotely through the use of electrically controlled adjustment motors or the like. The projector mount (or other components in the display system) may be configured for vibration and shock isolation of the projector, to prevent or reduce instances where a projector is damaged or becomes misaligned due to environmental conditions.

Further to FIG. 18 and related description, for implementations where the display system 100 is configured for a first heads up display 110 to be projected on a first windscreen 116 and a second heads up display 172 to be projected on a second windscreen 174 (simultaneously or at alternate times, and depending on the particular control scheme implemented, as described above), the display system may utilize either a single projector 332, as in FIG. 21 (for example), or two projectors as in FIG. 20 (for example). In regards to the former, a projector 332 would be positioned and/or configured for its light output to be selectively directed or redirected to either the first windscreen 116 or the second windscreen 174. In one embodiment, the projector 332 would be electrically remotely repositionable, using the adjustment motors 352 or otherwise. Thus, in a first orientation the light output of the projector 332 would be incident upon the first windscreen 116, for realizing the first heads up display 110. When it was desired to project a heads up display 174 on the second windscreen 174, the projector 332 would be repositioned to a second orientation, for the light output of the project to be incident upon the second windscreen 174. Alternatively, other mechanisms (mirror or optics units, light pipes, etc.) could be used to selectively redirect the light output of a generally fixed-position projector, onto a first windscreen, second windscreen, or other windscreen. (As should be appreciated, although certain embodiments are illustrated herein in regards to two heads up displays projector onto two windscreens, the display system could be configured for generating additional heads up displays on other windscreens, either simultaneously or at alternate times.) Alternatively, "split screen" technology could be used to project light onto two windscreens 116, 174 using a single projector, either simultaneously or at alternate times. Here, the projector and display control unit would be configured for the data or other video or display information designated for one heads up display to be confined within one half (or other portion) of the projector output, and for the data or other video or display information designated for another heads up display to be confined within the other half of the projector output. The light output of the projector output would then be optically processed and redirected (e.g., mirror system) for directing the data, etc. designated for each heads up display to its designated display surface on a first or second windscreen.

Figure 25:
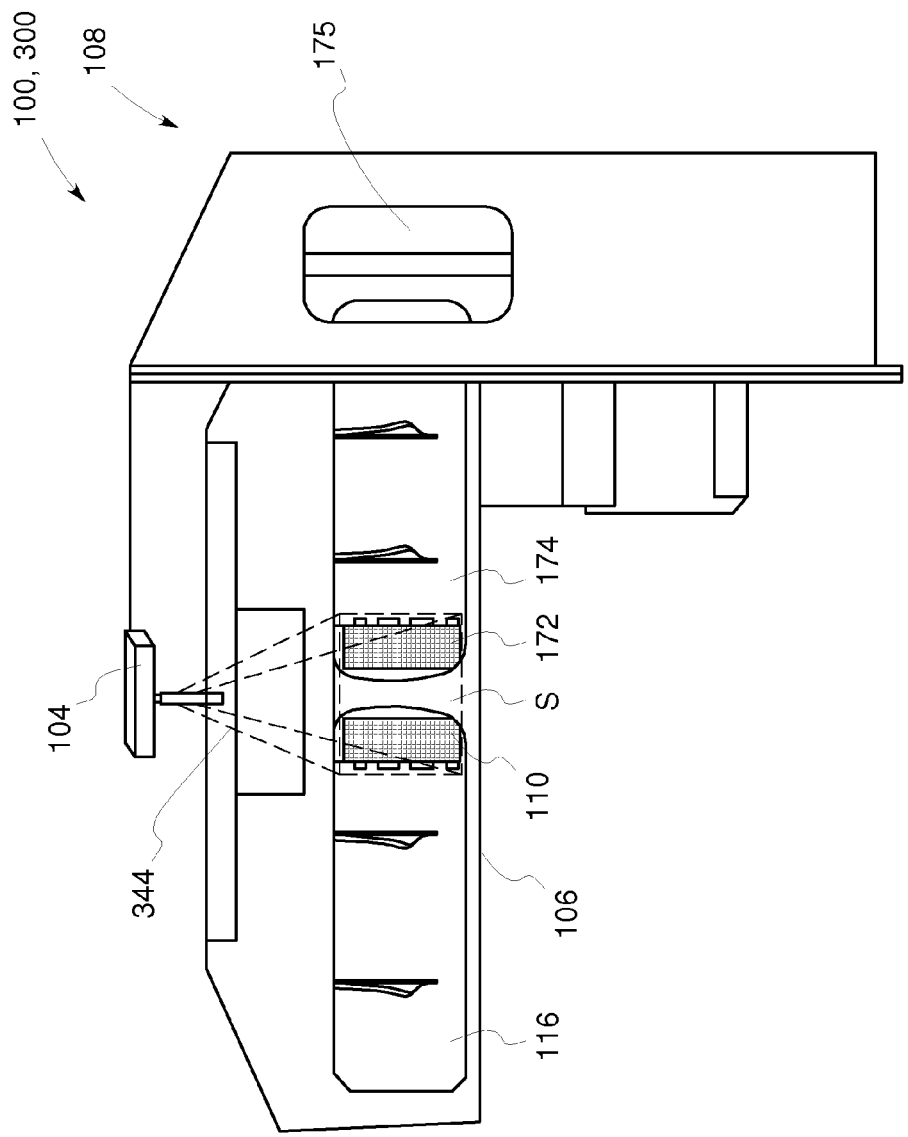
FIG. 25 is an elevation view, partly in cutaway, showing the interior of a vehicle operator cab in the context of another embodiment of the display system, comprising a single projector for projecting two heads up displays on two separate windscreens.

FIG. 25 shows another embodiment of the display system 100, using a single projector 104 for projecting first and second heads up displays 110, 172 on first and second windscreens 116, 174, respectively. Here, the projector 104 is positioned so that its light output is incident on the two adjacent but separate windscreens 116, 174, with the windscreens being separated from one another by a structural member "S." The output of the projector 104 is configured to that the first heads up display 110 is limited to the portion of the projector output that shines upon the first windscreen 116, and so that the second heads up display 172 is limited to the portion of the projector output that shines upon the second windscreen 174. The portion of the projector output that shines upon the structural member S is left dark/unlit, or minimally lit.

Again with respect to FIG. 25, another embodiment relates to a display system for displaying information to a vehicle operator. The display system comprises a display control unit 118 and a projector 104 positioned in an operator cab 160 of a vehicle 208. The display control unit is connected to the projector and to a control system 120 of the vehicle. The display control unit is configured to control the projector for projecting a first heads up display 110 on a first windscreen 116 of the vehicle and for projecting a second heads up display 172 on a second windscreen 174 of the vehicle. The first heads up display and the second heads up display each include respective information relating to operations of the vehicle. The first heads up display and the second heads up display are included within a unified light output of the projector, e.g., if the projector is configured to output a rectangular format video frame through a lens system, the two displays are included within the rectangular output frame. Additionally, the first and second windscreens are separate from one another (meaning that the designated display areas of the windscreens, onto which the heads up displays are projected, are not on the same underlying windscreen member/stratus and/or are separated by a structural member of the vehicle).

As mentioned above, in embodiments where a first heads up display 110 is projected on a first windscreen 116 and a second heads up display 172 is projected on a second windscreen 174, the display system may utilize two projectors 332, 334. Here, one projector 332 would be positioned for its light output to be incident on a display surface on the second windscreen 174, and the other projector 334 would be positioned for its light output to be incident on a display surface on the first windscreen 116. With respect to FIG. 20, for example, a front mount projector 334 could be used to project a heads up display on a front windscreen 116, and a top mount projector 332 could be used to project a heads up display on a rear windscreen 174. Other, similar configurations are possible, e.g., two top mount projectors, two short-throw projectors, projectors located in other positions, or the like.

Figure 22:
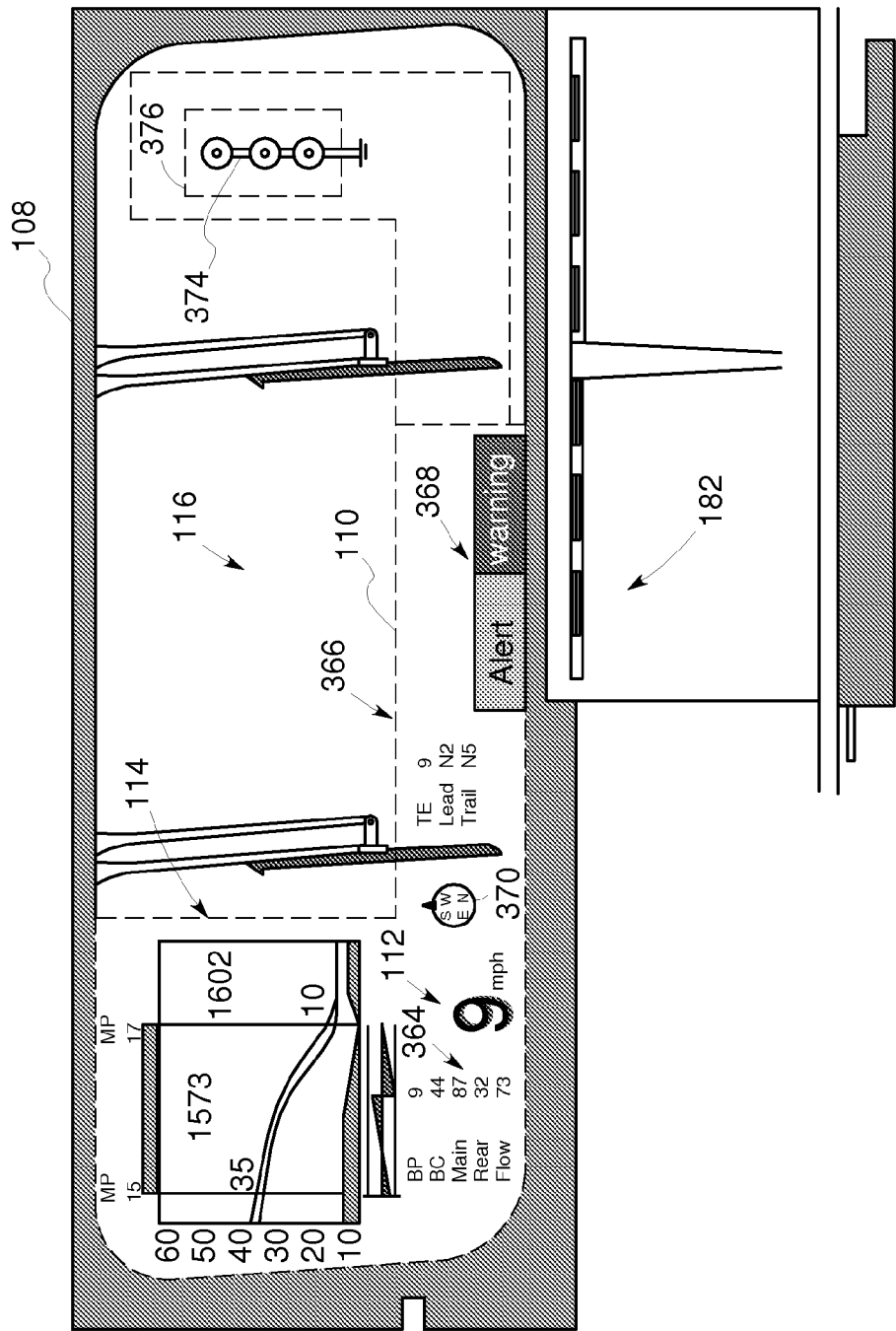
FIG. 22 shows an embodiment of a heads up display.

Another embodiment relates to a display system 100 for displaying information to an operator of a rail vehicle 108. The display system comprises a projector 104 positioned in an operator cab 106 of the rail vehicle 108. For example, the rail vehicle may be a locomotive. The projector is configured to project a heads up display 110 on a windscreen 116 of the rail vehicle. The display system additionally comprises a display control unit 118 connected to the projector and to a control system of the rail vehicle. The display control unit is configured to control the projector for displaying, as part of the heads up display, a plurality of data sets 112, 114 relating to operations of the rail vehicle. The displayed data sets are periodically updated based on information received from the control system 120 of the vehicle. With reference to FIG. 22, the data sets comprise a first data set 112 relating to a speed of the rail vehicle and a second data set 114 relating to a trip plan of the rail vehicle. "Trip plan" refers to a predetermined schedule for controlling the rail vehicle, comprising for example throttle and braking commands, which is at least partially electronically determined, and which is either carried out automatically by the control system of the rail vehicle, carried out partially by the operator and partially by the control system, or that is carried out by the operator based on control suggestions communicated to the operator. Examples of the types of information displayed to vehicle operators in relation to a trip plan, or in other contexts, can be found in U.S. Publication No. 2007-0219680-A1 dated Sep. 20, 2007; see, in particular, FIGS. 8-10 and related description.

In addition to illustrating displayed data elements of a vehicle speed 112 and vehicle trip plan 114, FIG. 22 shows other data elements and display elements that may be included in a heads up display 110, according to one or more aspects of the present invention. (Unless otherwise specified, the invention is not limited to a particular combination of display elements; instead, the number, type, positioning, etc. of display elements will vary from application to application, depending on a desired configuration of the display system.) Additional display elements may include brake information 364, distributed power and consist control information 366 or other information relating to linked vehicles (e.g., rail cars, trailers), alert and warning indicators 368, compass or other heading information 370, and the like. Other displayed information may include fuel levels, temperature indicators, vehicle condition indicators, and the current speed limit and other data relating to the route on which the vehicle is traveling.

Figure 23:
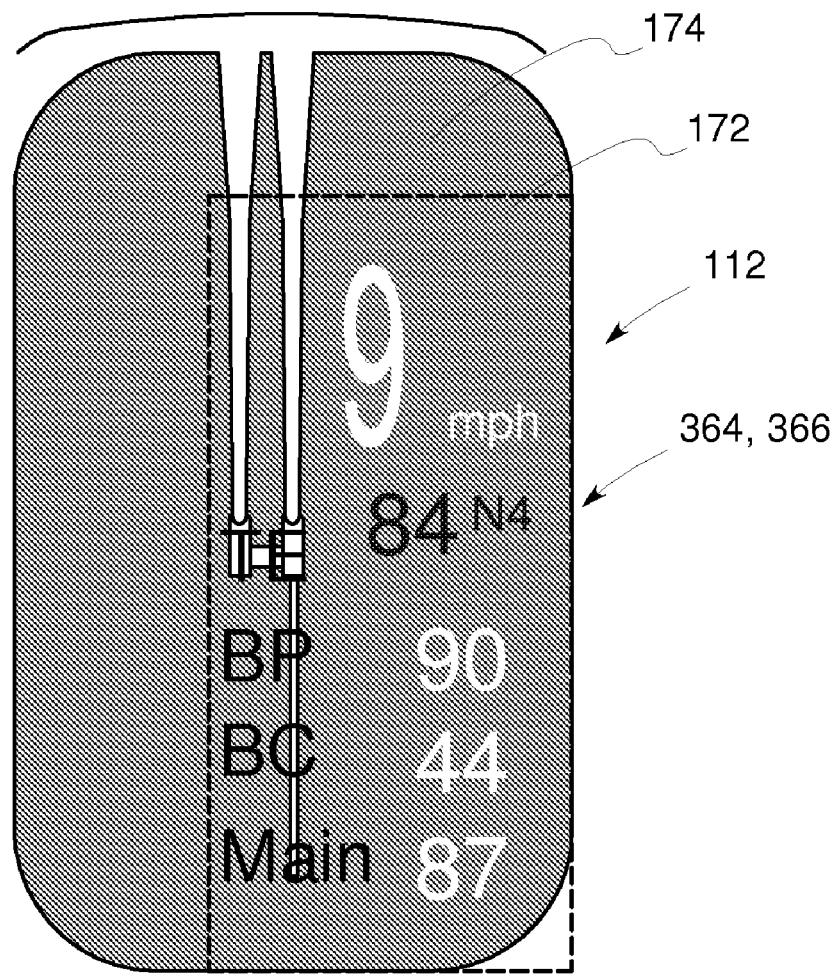
FIG. 23 shows an embodiment of a heads up display.

FIG. 23 illustrates a heads up display 172 projected on a smaller windscreen 174 (than the windscreen 116 in FIG. 22). In one embodiment, with respect to FIGS. 22 and 23, the display system (for displaying information to an operator of a rail vehicle) comprises a projector system 302 positioned in an operator cab of a rail vehicle. The display system further comprises a display control unit connected to the projector system and to a control system of the rail vehicle. The display control unit is configured to control the projector system 302 for projecting a first heads up display 110 on a front windscreen 116 of the rail vehicle 108 when the rail vehicle is traveling in a short-hood forward orientation. The display unit is further configured to control the projector system 302 for projecting a second heads up display 172 on a rear door window 174 of the rail vehicle when the rail vehicle is traveling at a long-hood forward orientation of the rail vehicle.

The heads up display 172 in FIG. 23 includes a display element of vehicle speed data 112, and a display element of other data 364, 366, such as brake data and distributed power data, for illustration/example purposes. Other data sets may be displayed, alternatively or in addition. However, FIG. 23 is illustrative of an embodiment of the display system where a heads up display is reduced in size/scope with respect to another heads up display (such a configuration, or variant thereof, is described above in regards to FIG. 13. In this example, with respect to FIGS. 22 and 23, both heads up displays 110, 172 include speed data and some brake and distributed power data. However, the one heads up display 110 (FIG. 22) includes additional information such as a data set 114 relating to a trip plan. As should be appreciated, such a configuration might be utilized where one windscreen 116 (on which the heads up display 110 with more data is projected) is a primary windscreen, and the other windscreen 174, on which the heads up display 172 with less information is projected, is a secondary windscreen. ("Primary" and "secondary" being defined, for example, based on which is viewed through more often by a vehicle operator during regular operations of the vehicle, and/or which is aligned for viewing external conditions with the most regular direction/orientation of travel of the vehicle.)

As noted above, the display format of a displayed data item may be based on external data. FIG. 22 illustrates a related embodiment, wherein features external to the vehicle 108 are identified and then highlighted or otherwise revised in appearance as viewed through a heads up display 110. More specifically, for this purpose the display system 100 may include a machine vision system 372 (see FIG. 19). The machine vision system 372 would include a camera or other image capture device for capturing image data of conditions external to the vehicle, a processor or other processing functionality (e.g., image analysis software executed by a processor 356) for processing the captured image data to identify features of interest (using standard image processing techniques), and functionality in the display control unit 118 or otherwise for correlating the identified features of interest with the heads up display 110 for highlighting or otherwise revising in appearance the identified feature of interest as viewed through the heads up display. For example, at a given point in time, the machine vision system 372 could calculate the position of the identified feature of interest in the image capture device's field of view and/or image sensor, correlate this to the field of view through the heads up display using data relating to the geometrical relationship between the image capture device, display surface (windscreen), and likely or designated operator position, determine the position of the identified feature of interest with respect to the heads up display from the perspective of the likely or designated operator position, and communicate with the display control unit 118 for generating and projecting a graphic or data element, as part of the heads up display, with respect to the determined position of the identified feature of interest with respect to the heads up display from the perspective of the likely or designated operator position.

One example of the resulting outcome of this process is shown in FIG. 22. A wayside signal device or other wayside device or other feature of interest 374 is shown as viewed through the windscreen 116 and heads up display area 110. The as-viewed position of the feature of interest 374 in the area of the heads up display is determined as described above, and a highlighting feature 376 (here a dashed-line rectangle) is projected as part of the heads up display around the view of the feature of interest 374. Although the image of the feature of interest is not part of the projected heads up display, but is instead viewed through the heads up display, the projected and external images appear coincident to the vehicle operator or other appropriately positioned viewer. Highlighting or other appearance revision may be based not only on identifying features of interest, but other data such as vehicle speed, signal status, other variable characteristics of a feature of interest, or the like. For example, it may be the case that a wayside signal device is highlighted only if the signal aspect of the wayside signal device indicates a route restriction (e.g., stop, slow).

The display system 100 may comprise the sole means of providing vehicle information to a vehicle operator. In some vehicle applications, however, the display system may be complementary or supplemental to other information sources. In such a case, even if the display system entered a fault or failure mode, either partially or wholly, the vehicle operator would still be apprised of vehicle data from other sources.

Figure 24:
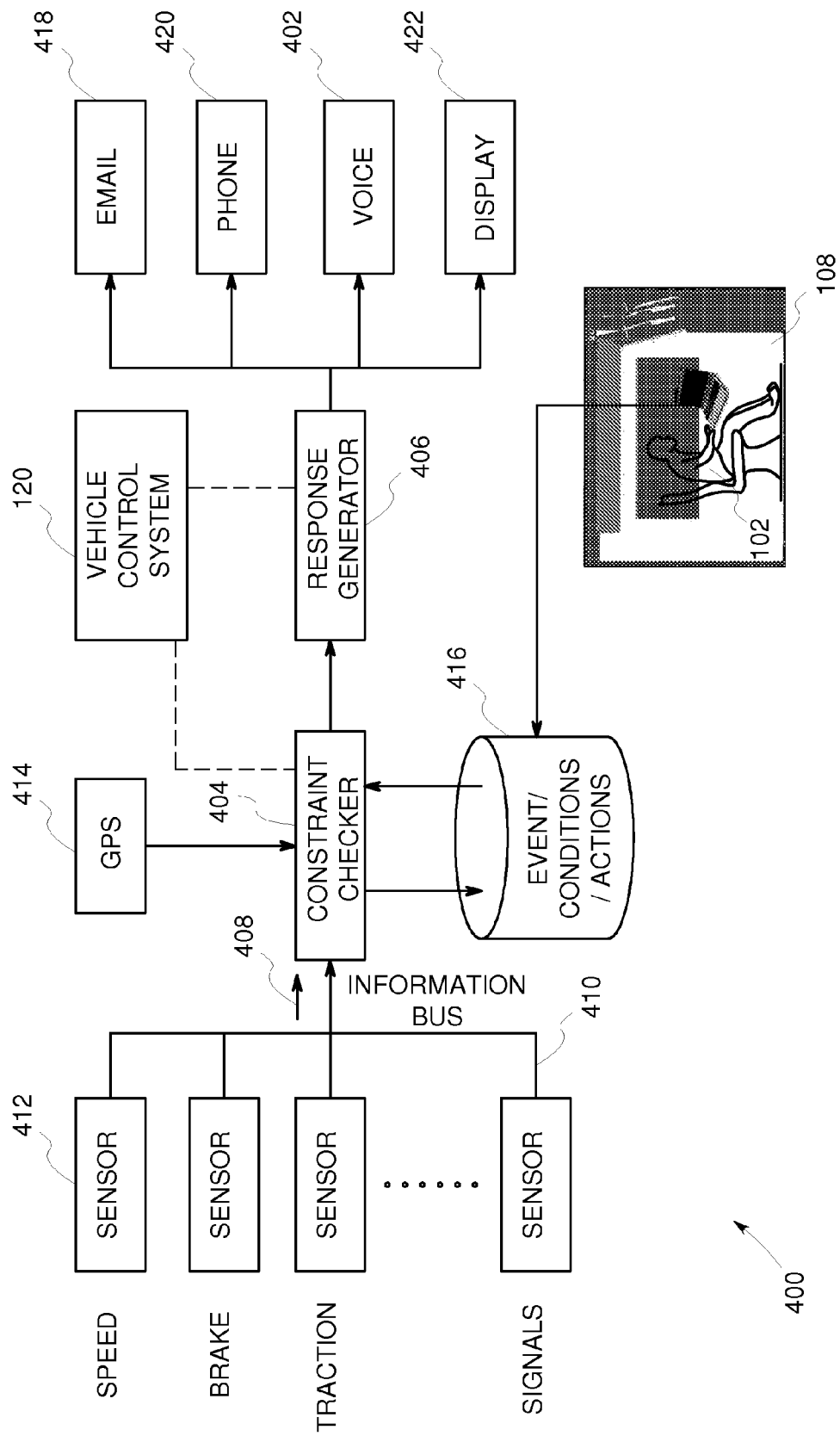
FIG. 24 is a schematic diagram of a voice alert system according to an embodiment of the present invention.

At least in some embodiments, the display system 100 provides information to vehicle operators and other personnel in a manner that facilitates ease of viewing (and possibly comprehending) the information when operating a vehicle. This effect can be supplemented and enhanced, or even realized in vehicle implementations where a display system is not used, according to another embodiment where a voice alert system 400 is interfaced with a vehicle control system 120 in a vehicle 108, as shown in FIGS. 1 and 24. The voice alert system 400 is configured is notify vehicle operators (or others in a vehicle) of designated identified events that have occurred or that will occur, using voice alerts 402. A voice alert 402 is a machine generated audio signal, e.g., output over speakers, that mimics (or at least is identifiable as) human language for conveying designated information. For example, the system 400 may determine that the vehicle has entered into a region where horn use is restricted, and then generate and output a voice alert 402 to the operator, identifiable as human language, informing the operator that "Horn use is restricted."

With reference to FIG. 24, in one embodiment the voice alert system 400 comprises a constraint checker 404 and a response generator 406, one or both of which are connected or otherwise interfaced with the vehicle control system 120. (The constraint checker 404 and response generator 406 may be implemented in hardware and/or software, and could be part of the vehicle control system.) The constraint checker 404 receives data 408 relating to vehicle operation. The data may be received over a communication/information bus 410, from various sensors or similar elements or other sources 412. Although shown separate from the vehicle control system 120, the sensors or other data sources 412 may be part of the vehicle control system. Alternatively, some or all of the sensors or other data sources 412 may be implemented as part of the voice alert system 400. The data sources 412 generate data 408 and provide it to the constraint checker. Examples of the type of vehicle operation-related data that may be provided include speed data, brake data, fraction data, wayside signal device data, communication data arriving from external sources (e.g., news bulletins, dispatch communications), and the like. Position data may also be provided to the constraint checker 404, from a GPS module or other position determination system 414.

The constraint checker 404 includes data and/or logic functionality 416 for identifying designated events. (A "designated event" is a type of event that is pre-determined as being of interest for issuing a voice alert.) A designated event may be identified by analyzing the vehicle operation data 408, position data from the position determination system 414, and/or other data and determining if the data matches one or more criteria of a designated event. For example, if a designated event is "exceeding the current speed limit," the constraint checker 404 may (i) determine the current speed limit based on the location of the vehicle (from the data generated by the position determination system), by cross-referencing the position to a database 416 containing respective speed limits for various positions (or ranges of positions) along the intended route of the vehicle, and (ii) compare the current speed of the vehicle (included in the data 408) to the determined current speed limit. If the current speed exceeds the current speed limit, the constraint checker has identified a designated event of the current speed limit being exceeded.

Once a designated event has been identified, information relating to the designated event is provided to the response generator 406. The response generator 406 then generates a voice alert 402 based on the received data. For this purpose, the response generator 406 may include a database or other data sourcing listing a respective designated response for each potential designated event. When a designated event is identified, the designated response is modified, if needed, based on data received from the constraint checker. For example, if the identified designated event is a current speed limit having been exceeded, the constraint checker 404 provides data to the response generator 406 indicative of such. The response generator 406 uses this data to determine a designated response for exceeding the speed limit (e.g., "Exceeding speed limit"), which forms the basis of a voice alert 402 to this effect. An example of modifying the designated response would be for the constraint checker 404 to provide data relating to degree of excessive speed, which is incorporated into the designated response, e.g., "Exceeding speed limit by {x} mph," where {x} is a human language representation of the degree of excessive speed. In addition to voice alerts 402, other possible alerts include e-mail alerts 418, phone alerts 420, and display alerts 422.

As noted, the voice alert system 400 may be configured for generating voice alerts 402 in advance of the occurrence of a designated event, based on predictions of designated events or otherwise. For example, based on position data and route information, the system 400 could determine that the vehicle is close to entering a restricted zone, and generate a voice alert alerting the vehicle operation of the impending event.

The voice alert system 400 may also be configured as, or as part of, an operator alert system. Here, a voice alert 402 would be generated on a designated periodic basis, asking the operator to perform a designated function for maintaining, or verifying, alertness.

Unless otherwise specified, the voice alert system 400 is not limited to certain types or categories of designated events. Other examples of designated events include other vehicle system changes (e.g., engine faults, wheel conditions, excessive temperatures), other events relating to external position or conditions, events relating to other systems in the vehicle (e.g., notification that a manual control area is approaching under operation of an automatic or semi-automatic vehicle control system, notification of com loss idle down in distributed power operations), notification of loss of consist horsepower, notification of car brake valve failure, as well as others.

Another embodiment relates to a method for displaying information to a vehicle operator. The method comprises generating a heads up display of a first data set on a first area of a first windscreen of a vehicle. The method further comprises assessing a priority level of the first data set relative to operation of the vehicle. The method further comprises, based on the assessed priority level of the first data set, moving the display of the first data set from the first area of the windscreen to a second area of the windscreen.

In another embodiment of the method, an operator prominence level of the display of the first data set is greater at the second area of the windscreen than at the first area.

In another embodiment, the method further comprises progressively moving the display of the first data set from the first area to a plurality of intermediate areas of the windscreen between the first area and the second area, based on changes in the assessed priority level of the first data set.

In another embodiment, the method further comprises changing a display format of the display of the first data set each time the display is moved from one of the areas to another of the areas.

In another embodiment, the method further comprises positioning the display of the first data set between the first area and the second area proportional to the assessed priority level of the first data set. The display is positioned at the first area when the assessed priority level of the first data set is at a lowest value in a designated priority range of the first data set and the display is positioned at the second area when the assessed priority level of the first data set is at a highest value in the designated priority range of the first data set.

In another embodiment of the method, the display is positioned non-linearly proportional to the assessed priority level of the first data set.

In another embodiment of the method, the first area is at a periphery of the windscreen and the second area is located closer to a center of the windscreen than the first area.

In another embodiment, the method further comprises generating a heads up display of a second data set on a third area of the windscreen. A priority level of the second data set is assessed relative to operation of the vehicle. If the assessed priority level of the second data is greater than the assessed priority level of the first data set, the display of the second data set is moved from the third area to the second area, instead of the first data set.

In another embodiment, the method further comprises generating a heads up display of a second data set on a third area of the windscreen. A priority level of the second data set is assessed relative to operation of the vehicle. Based on the assessed priority level of the second data set, the display of the second data set is moved from the third area to a fourth area of the windscreen. An operator prominence level of the display of the second data set is greater at the fourth area of the windscreen than at the third area.

In another embodiment of the method, the third area is at a periphery of the windscreen and the fourth area is located closer to a center of the windscreen than the third area.

In another embodiment, the method further comprises changing a display format of the display of the first data set when the display is moved to the second area.

In another embodiment, the method further comprises generating a heads up display of a second data set on a second windscreen of the vehicle. A priority level of the second data set is assessed relative to operation of the vehicle. Based on the assessed priority level of the second data set, the display of the second data set is moved from the second windscreen to a third area on the first windscreen.

Another embodiment relates to a display system for displaying information to a vehicle operator. The display system comprises a projector and a display control unit connected to the projector and to a control system of the vehicle. The projector is positioned in an operator cab of a vehicle, and is configured to project a heads up display of a plurality of data sets on a windscreen of the vehicle. The display control unit is configured to control the projector for moving a first of said data sets in the display from a first area of the windscreen to a second area of the windscreen, based on an assessed priority level of the first data set.

In another embodiment of the display system, an operator prominence level of the first data set, when displayed at the second area, is greater than when the first data set is displayed at the first area.

In another embodiment of the display system, the display control unit is further configured to control the projector to progressively move the first data set from the first area to a plurality of intermediate areas of the windscreen between the first area and the second area, based on changes in the assessed priority level of the first data set.

In another embodiment of the display system, the display control unit is further configured to control the projector to change a display format of the first data set each time the first data set is moved from one of the areas to another of the areas.

In another embodiment of the display system, the display control unit is further configured to control the projector to position the first data set between the first area and the second area proportional to the assessed priority level of the first data set. The first data set is positioned at the first area when the assessed priority level of the first data set is at a lowest value in a designated priority range of the first data set and the first data set is positioned at the second area when the assessed priority level of the first data set is at a highest value in the designated priority range of the first data set.

In another embodiment of the display system, the display control unit is further configured to control the projector to position the first data set non-linearly proportional to the assessed priority level of the first data set.

In another embodiment of the display system, the first area is at a periphery of the windscreen and the second area is located closer to a center of the windscreen than the first area.

In another embodiment of the display system, the display control unit is further configured to control the projector for moving a second of said data sets from a third area of the windscreen to a fourth area of the windscreen, based on an assessed priority level of the second data set. An operator prominence level of the second data set, when displayed at the fourth area, is greater than when the second data set is displayed at the third area.

In another embodiment of the display system, the third area is at a periphery of the windscreen and the fourth area is located closer to a center of the windscreen than the third area.

In another embodiment of the display system, the display control unit is further configured to control the projector to change a display format of the first data set when the first data set is moved to the second area.

Another embodiment relates to a display system for displaying information to an operator of a rail vehicle. The display system comprises a projector positioned in an operator cab of a rail vehicle and a display control unit connected to the projector and to a control system of the vehicle. The projector is configured to project a heads up display on a windscreen of the rail vehicle. The display control unit is configured to control the projector for displaying, as part of the heads up display, a plurality of data sets relating to operations of the rail vehicle. The displayed data sets are periodically updated based on information received from the control system of the vehicle. The data sets comprise a first data set relating to a speed of the rail vehicle and a second data set relating to a trip plan of the rail vehicle.

In another embodiment of the display system, the display control unit is configured to control the projector for moving at least one of the data sets from a first area of the windscreen to a second area of the windscreen, based on a respective assessed priority level of said at least one of the data sets.

In another embodiment of the display system, the first area is at a periphery of the windscreen and the second area is located closer to a center of the windscreen than the first area.

In another embodiment of the display system, the first area is at one of the left side of the windscreen or the right side of the windscreen, and the second area is located at a bottom area of the windscreen closer to a vertical center axis of the windscreen than the first area.

In another embodiment of the display system, the display control unit is configured to control the projector for changing a respective display format of the at least one of the data sets when the at least one of the data sets is moved from the first area to the second area.

In any of the aforementioned embodiments, a projected data set or other display element may be varied, based on assessed priority level, not only in terms of position, but also (or alternatively) in terms of size. For example, the displayed font size of a data set may be increased as the priority level of the data set increases. Thus, another embodiment of the present invention relates to a method for displaying information to a vehicle operator. The method comprises generating a heads up display of a first data set on a first area of a first windscreen of a vehicle, assessing a priority level of the first data set relative to operation of the vehicle, and, based on the assessed priority level of the first data set, moving the display of the first data set from the first area of the windscreen to a second area of the windscreen. The method further comprises changing a display format of the display of the first data set based on the assessed priority level, from a first display format at a first priority level to a second display format at a second, higher priority level. An operator prominence level of the first data set, when displayed according to the second display format, is greater than an operator prominence level of the first data set when displayed according to the first display format. Here, operator prominence level is not necessarily defined in terms of the position of the data set in relation to the windscreen and operator station, but is instead based on how apparent or noticeable the displayed data set is to an operator at a particular single location of the data set. Notwithstanding for foregoing, operator prominence level may vary based on both position and display format, e.g., based on assessed priority the position of a displayed data set is moved and the display format of the data set is changed. Change in display format (based on assessed priority level) may be continuous/progressive, stepped, or a combination thereof.

In one embodiment, for example, the display formats relate to size. Thus, a size of the displayed first data set is greater according to the second display format than the first display format, it being appreciated that the operator prominence level of a larger size data set is greater than the operator prominence level of a smaller size data set, because the larger data set is easier to see, is more apparent, and takes up more of the heads up display.

The various embodiments set forth herein are all applicable both to direct projection heads up displays, which involve projection directly onto a windscreen, and to heads up displays involving the projection of light to a focal point in front of the windscreen.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Since certain changes may be made in the above-described system and method for displaying information to a vehicle operator, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for displaying information to a vehicle operator, the method comprising:
   generating a first heads up display on a first windscreen of a vehicle, when the vehicle is traveling at a first orientation of the vehicle; and
   generating a second heads up display on a second windscreen of the vehicle, when the vehicle is traveling at a second orientation of the vehicle, the second orientation being different than the first orientation, wherein the first and second heads up displays each include respective information relating to operations of the vehicle.

2. The method of claim 1 wherein an operator orientation of the first windscreen is located at an angle of about 180 degrees with respect to an operator orientation of the second windscreen.

3. The method of claim 1 wherein:
   the first heads up display comprises a plurality of data sets each relating to a different aspect of vehicle operations; and
   the second heads up display comprises at least one of the plurality of data sets of the first heads up display, but fewer than all the plurality of data sets of the first heads up display.

4. The method of claim 1 wherein the heads up display on the first windscreen is deactivated when the vehicle is traveling at the second orientation of the vehicle, and wherein the heads up display on the second windscreen is deactivated when the vehicle is traveling at the first orientation of the vehicle.

5. The method of claim 4 wherein:
   the first heads up display comprises a plurality of data sets each relating to a different aspect of vehicle operations; and
   the second heads up display comprises at least one of the plurality of data sets of the first heads up display, but fewer than all the plurality of data sets of the first heads up display.

6. The method of claim 4 wherein:
   the first and second heads up displays are generated by a projector positioned in an operator cab of the vehicle; and
   the method further comprises orienting the projector for direct projection of the first heads up display on the first windscreen when the vehicle is traveling at the first orientation of the vehicle, and re-orienting the projector for direct projection of the second heads up display on the second windscreen when the vehicle is traveling at the second orientation of the vehicle.

7. The method of claim 6 wherein:
   the first heads up display comprises a plurality of data sets each relating to a different aspect of vehicle operations; and
   the second heads up display comprises at least one of the plurality of data sets of the first heads up display, but fewer than all the plurality of data sets of the first heads up display.

8. The method of claim 1 wherein the vehicle is a rail vehicle, the first windscreen comprises a front windscreen of the rail vehicle, and the second windscreen comprises a rear door window of the rail vehicle, the second orientation of the vehicle comprising a long-hood forward orientation of the rail vehicle.

9. A display system for displaying information to a vehicle operator, the display system comprising:
   a projector system positioned in an operator cab of a vehicle; and
   a display control unit connected to the projector system and to a control system of the vehicle, the display control unit configured to control the projector system for projecting a first heads up display on a first windscreen of the vehicle when the vehicle is traveling at a first orientation of the vehicle, and the display unit further configured to control the projector system for projecting a second heads up display on a second windscreen of the vehicle when the vehicle is traveling at a second orientation of the vehicle, the second orientation being different than the first orientation, wherein the first and second heads up displays each include respective information relating to operations of the vehicle.

10. The display system of claim 9 wherein an operator orientation of the first windscreen is located at an angle of about 180 degrees with respect to an operator orientation of the second windscreen.

11. The display system of claim 9 wherein:
    the first heads up display comprises a plurality of data sets each relating to a different aspect of vehicle operations; and
    the second heads up display comprises at least one of the plurality of data sets of the first heads up display, but fewer than all the plurality of data sets of the first heads up display.

12. The display system of claim 9 wherein the display control unit is configured to deactivate the heads up display on the first windscreen when the vehicle is traveling at the second orientation of the vehicle, and to deactivate the heads up display on the second windscreen when the vehicle is traveling at the first orientation of the vehicle.

13. The display system of claim 12 wherein:
    the first heads up display comprises a plurality of data sets each relating to a different aspect of vehicle operations; and the second heads up display comprises at least one of the plurality of data sets of the first heads up display, but fewer than all the plurality of data sets of the first heads up display.

14. The display system of claim 12 wherein:
the projector system comprises a projector; and
the display system further comprises a projector mount system connected to a surface of the operator cab, the projector being attached to and supported by the projector mount system, wherein the projector mount system is controllably for movement of the projector to a plurality of different projector orientations;
wherein the display control unit is configured to control the projector mount system to orient the projector for projection of the first heads up display on the first windscreen when the vehicle is traveling at the first orientation of the vehicle, and to control the projector mount system to re-orient the projector for projection of the second heads up display on the second windscreen when the vehicle is traveling at the second orientation of the vehicle.

15. The display system of claim 14 wherein:
the first heads up display comprises a plurality of data sets each relating to a different aspect of vehicle operations; and
the second heads up display comprises at least one of the plurality of data sets of the first heads up display, but fewer than all the plurality of data sets of the first heads up display.

16. The display system of claim 12 wherein:
the projector system comprises a projector; and
the display system further comprises an output redirection device operably coupled to the projector, the output redirection device being electrically controllable for redirecting light projected by the projector;
wherein the display control unit is configured to control the output redirection device for projection of the first heads up display on the first windscreen when the vehicle is traveling at the first orientation of the vehicle, and to control the output redirection device for projection of the second heads up display on the second windscreen when the vehicle is traveling at the second orientation of the vehicle.

17. The display system of claim 16 wherein the projector is fixed in place.

18. A display system for displaying information to an operator of a rail vehicle, the display system comprising:
a projector system positioned in an operator cab of a rail vehicle; and
a display control unit connected to the projector system and to a control system of the rail vehicle, wherein the display control unit is configured to control the projector system for projecting a first heads up display on a front windscreen of the rail vehicle when the rail vehicle is traveling in a short-hood forward orientation, and wherein the display unit is further configured to control the projector system for projecting a second heads up display on a rear door window of the rail vehicle when the rail vehicle is traveling at a long-hood forward orientation of the rail vehicle, wherein the first and second heads up displays each include respective information relating to operations of the rail vehicle.

19. The display system of claim 18 wherein:
the first heads up display comprises a plurality of data sets each relating to a different aspect of vehicle operations; and
the second heads up display comprises at least one of the plurality of data sets of the first heads up display, but fewer than all the plurality of data sets of the first heads up display.

20. The display system of claim 18 wherein the display control unit is configured to deactivate the heads up display on the front windscreen when the rail vehicle is traveling at the long-hood forward orientation, and to deactivate the heads up display on the rear door window when the rail vehicle is traveling at the short-hood forward orientation of the vehicle.

21. The display system of claim 20 wherein:
the projector system comprises a projector; and
the display system further comprises a projector mount system connected to a surface of the operator cab, the projector being attached to and supported by the projector mount system, wherein the projector mount system is controllably for movement of the projector to a plurality of different projector orientations;
wherein the display control unit is configured to control the projector mount system to orient the projector for projection of the first heads up display on the front windscreen when the rail vehicle is traveling at the short-hood forward orientation of the rail vehicle, and to control the projector mount system to re-orient the projector for projection of the second heads up display on the rear door window when the rail vehicle is traveling at the long-hood forward orientation of the rail vehicle.

22. A display system for displaying information to a vehicle operator, the display system comprising:
a projector positioned in an operator cab of a vehicle; and
a display control unit connected to the projector and to a control system of the vehicle, the display control unit configured to control the projector for projecting a first heads up display on a first windscreen of the vehicle and for projecting a second heads up display on a second windscreen of the vehicle, wherein the first heads up display and the second heads up display each include respective information relating to operations of the vehicle;
wherein the first heads up display and the second heads up display are included within a unified light output of the projector; and
wherein the first and second windscreens are separate from one another.

23. A method for displaying information to a vehicle operator, the method comprising:
generating a heads up display of a first data set on a first area of a first windscreen of a vehicle;
assessing a priority level of the first data set relative to operation of the vehicle; and
based on the assessed priority level of the first data set, moving the display of the first data set from the first area of the windscreen to a second area of the windscreen.

24. The method of claim 23 wherein an operator prominence level of the display of the first data set is greater at the second area of the windscreen than at the first area.

25. The method of claim 23 further comprising:
progressively moving the display of the first data set from the first area to a plurality of intermediate areas of the windscreen between the first area and the second area, based on changes in the assessed priority level of the first data set.

26. The method of claim 25 further comprising:
changing a display format of the display of the first data set each time the display is moved from one of the areas to another of the areas.

27. The method of claim 23 further comprising:
positioning the display of the first data set between the first area and the second area proportional to the assessed priority level of the first data set, wherein the display is positioned at the first area when the assessed priority level of the first data set is at a lowest value in a designated priority range of the first data set and the display is positioned at the second area when the assessed priority level of the first data set is at a highest value in the designated priority range of the first data set.

28. The method of claim 27 wherein the display is positioned non-linearly proportional to the assessed priority level of the first data set.

29. The method of claim 23 wherein the first area is at a periphery of the windscreen and the second area is located closer to a center of the windscreen than the first area.

30. The method of claim 23 further comprising:
generating a heads up display of a second data set on a third area of the windscreen;
assessing a priority level of the second data set relative to operation of the vehicle; and
if the assessed priority level of the second data is greater than the assessed priority level of the first data set, moving the display of the second data set from the third area to the second area, instead of the first data set.

31. The method of claim 23 further comprising:
changing a display format of the display of the first data set based on the assessed priority level, from a first display format at a first priority level to a second display format at a second, higher priority level, wherein an operator prominence level of the first data set when displayed according to the second display format is greater than an operator prominence level of the first data set when displayed according to the first display format.

32. The method of claim 31 wherein a size of the displayed first data set is greater according to the second display format than the first display format.

33. A method for displaying information to a vehicle operator, the method comprising:
generating a heads up display of a data set on a windscreen of a vehicle;
assessing a priority level of the data set relative to operation of the vehicle; and
based on the assessed priority level of the data set, changing a display format of the data set from a first display format to a second display format, wherein an operator prominence level of the data set, when displayed at the second display format, is greater than an operator prominence level of the data set when displayed at the first display format.

34. The method of claim 33 wherein a size of the displayed data set is larger at the second display format than at the first display format.

* * * * *